US012587916B2

(12) United States Patent
Karabulut et al.

(10) Patent No.: US 12,587,916 B2
(45) Date of Patent: Mar. 24, 2026

(54) TIMING ADVANCE TRIGGERING MEASUREMENT REPORT FOR FR2 HANDOVER

(71) Applicant: Nokia Technologies Oy, Espoo (FI)

(72) Inventors: Umur Karabulut, Munich (DE); Halit Murat Gürsu, Munich (DE); Ahmad Awada, Munich (DE); Jedrzej Stanczak, Wroclaw (PL); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/474,438

(22) Filed: Sep. 26, 2023

(65) Prior Publication Data

US 2024/0121676 A1     Apr. 11, 2024

(30) Foreign Application Priority Data

Sep. 29, 2022     (GB) ...................................... 2214245

(51) Int. Cl.
*H04W 36/00* (2009.01)
*H04W 36/08* (2009.01)

(52) U.S. Cl.
CPC ....... *H04W 36/0072* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 5,711,003 A | 1/1998 | Dupuy | |
| 6,804,212 B1 | 10/2004 | Vallstrom et al. | |
| 2008/0084849 A1 | 4/2008 | Wang et al. | |
| 2022/0046490 A1 | 2/2022 | Tripathi et al. | |
| 2022/0248286 A1* | 8/2022 | Sedin .............. H04W 36/00835 | |
| 2023/0276336 A1* | 8/2023 | Wu ..................... H04W 36/326 |
| | | | 370/331 |

(Continued)

FOREIGN PATENT DOCUMENTS

| | | |
|---|---|---|
| KR | 20180093215 A | 8/2018 |
| WO | 93/12623 A1 | 6/1993 |

(Continued)

OTHER PUBLICATIONS

Author Unknown, Discussion on NTN Mobility Enhancements, Doc. No. R2-2208377, pp. 1-7, Aug. 26, 2022.*

(Continued)

*Primary Examiner* — Christopher M Crutchfield
(74) *Attorney, Agent, or Firm* — Nokia Technologies Oy

(57) ABSTRACT

An apparatus includes at least one processor; and at least one memory including computer program code; wherein the at least one memory and the computer program code are configured to, with the at least one processor, cause the apparatus at least to: establish a connection with a source cell; determine a first timing advance that indicates a propagation delay of uplink transmission to the source cell; determine a second timing advance that indicates a propagation delay of uplink transmission to a target cell; determine whether to initiate a handover procedure to the target cell, based at least on the first timing advance; and synchronize to the target cell during the handover procedure.

19 Claims, 16 Drawing Sheets

(56) References Cited

U.S. PATENT DOCUMENTS

| | | | | |
|---|---|---|---|---|
| 2023/0396323 A1* | 12/2023 | Yavuz | ............... | H04B 7/18513 |
| 2024/0373299 A1* | 11/2024 | Teyeb | .................. | H04W 36/24 |
| 2025/0168718 A1* | 5/2025 | Zou | ................... | H04B 7/06952 |

FOREIGN PATENT DOCUMENTS

| WO | 2012/045337 | A1 | 4/2012 |
|---|---|---|---|
| WO | 2022/021080 | A1 | 2/2022 |
| WO | 2023/036435 | A1 | 3/2023 |

OTHER PUBLICATIONS

Office action received for corresponding European Patent Application No. 23199933.5, dated Mar. 24, 2025, 7 pages.

Office action received for corresponding United Kingdom Patent Application No. 2214245.9, dated Apr. 10, 2025, 4 pages.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"3rd Generation Partnership Project; Technical Specification Group Radio Access Network; NR; Physical channels and modulation (Release 17)", 3GPP TS 38.211, V17.1.0, Mar. 2022, pp. 1-135.

"3rd Generation Partnership Project; Technical Specification Group Radio Access Network; Study on channel model for frequencies from 0.5 to 100 GHz (Release 17)", 3GPP TR 38.901, V17.0.0, Mar. 2022, pp. 1-98.

Karabulut, "Mobility Management in 5G Beamformed Systems", Doctoral Dissertation, Feb. 18, 2021, 168 pages.

"3rd Generation Partnership Project; Technical Specification Group Radio Access Network; NR; Physical layer procedures for control (Release 17)", 3GPP TS 38.213, V17.1.0, Mar. 2022, pp. 1-245.

"3rd Generation Partnership Project; Technical Specification Group Radio Access Network; NR; Medium Access Control (MAC) protocol specification (Release 15)", 3GPP TS 38.321, V15.3.0, Sep. 2018, pp. 1-76.

"3rd Generation Partnership Project; Technical Specification Group Radio Access Network; NR; Requirements for support of radio resource management (Release 17)", 3GPP TS 38.133, V17.5.0, Mar. 2022, 3407 pages.

Combined Search and Examination Report received for corresponding United Kingdom Patent Application No. 2214245.9, dated Mar. 22, 2023, 4 pages.

Extended European Search Report received for corresponding European Patent Application No. 23199933.5, dated Feb. 14, 2024, 10 pages.

* cited by examiner

1300

PROCESSOR(S)

1302

MEMORY

COMPUTER PROGRAM CODE

1305

1306 — CONTROL

1304

1312

1308 — DISPLAY AND/OR I/O

1310 — COMMUNICATION I/F 1402　　1400a 1402　　1400b

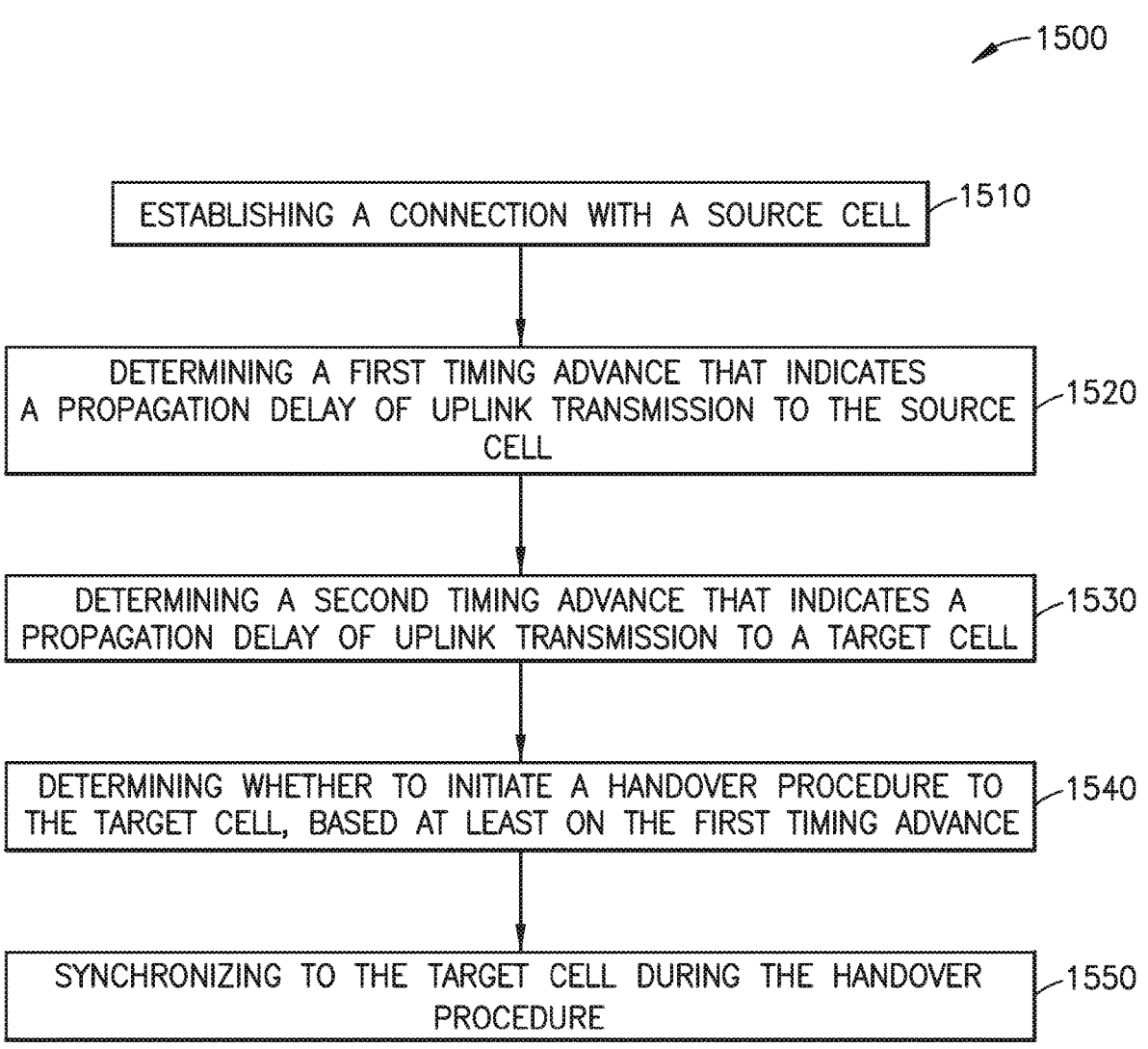

1500

ESTABLISHING A CONNECTION WITH A SOURCE CELL ⌐1510

DETERMINING A FIRST TIMING ADVANCE THAT INDICATES A PROPAGATION DELAY OF UPLINK TRANSMISSION TO THE SOURCE CELL ⌐1520

DETERMINING A SECOND TIMING ADVANCE THAT INDICATES A PROPAGATION DELAY OF UPLINK TRANSMISSION TO A TARGET CELL ⌐1530

DETERMINING WHETHER TO INITIATE A HANDOVER PROCEDURE TO THE TARGET CELL, BASED AT LEAST ON THE FIRST TIMING ADVANCE ⌐1540

SYNCHRONIZING TO THE TARGET CELL DURING THE HANDOVER PROCEDURE ⌐1550

FIG.15

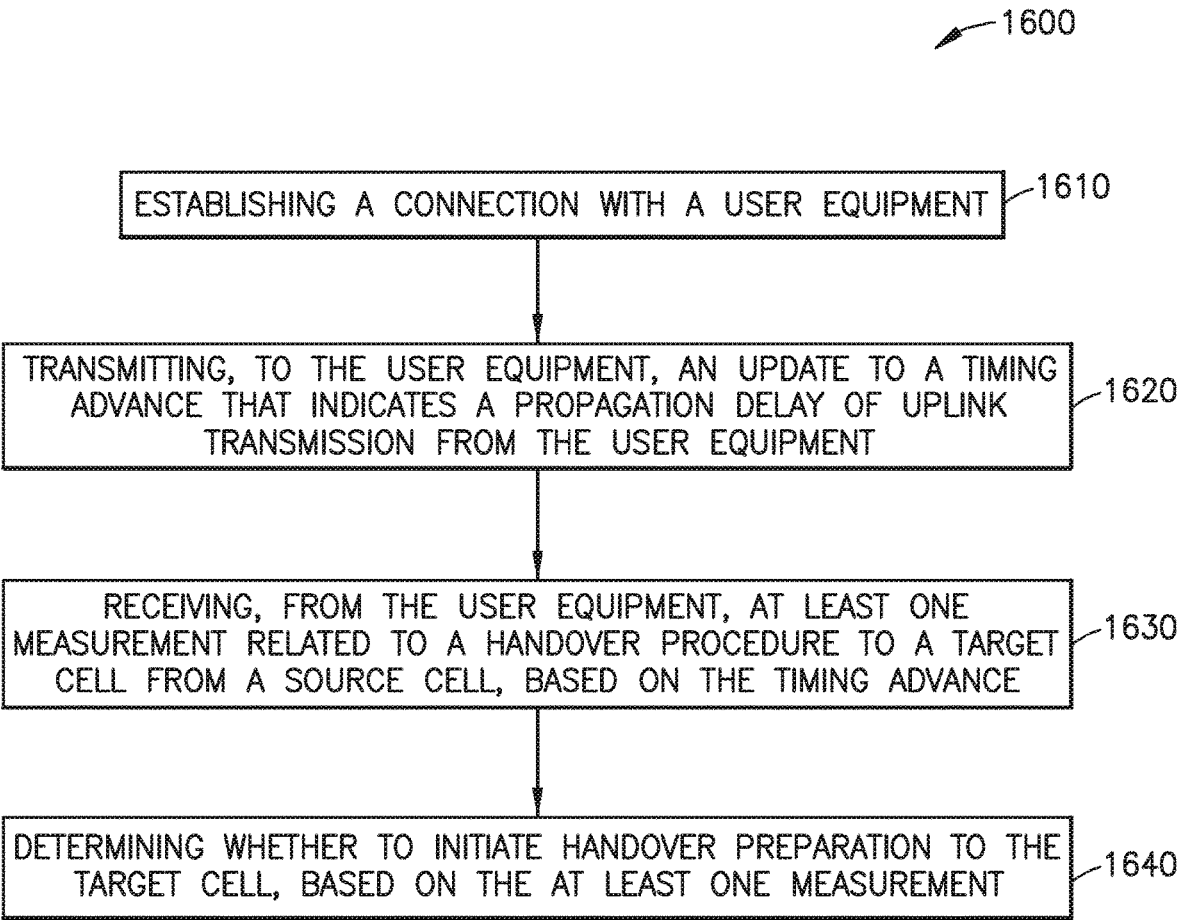

1600

ESTABLISHING A CONNECTION WITH A USER EQUIPMENT — 1610

TRANSMITTING, TO THE USER EQUIPMENT, AN UPDATE TO A TIMING ADVANCE THAT INDICATES A PROPAGATION DELAY OF UPLINK TRANSMISSION FROM THE USER EQUIPMENT — 1620

RECEIVING, FROM THE USER EQUIPMENT, AT LEAST ONE MEASUREMENT RELATED TO A HANDOVER PROCEDURE TO A TARGET CELL FROM A SOURCE CELL, BASED ON THE TIMING ADVANCE — 1630

DETERMINING WHETHER TO INITIATE HANDOVER PREPARATION TO THE TARGET CELL, BASED ON THE AT LEAST ONE MEASUREMENT — 1640

TIMING ADVANCE TRIGGERING MEASUREMENT REPORT FOR FR2 HANDOVER

TECHNICAL FIELD

The examples and non-limiting embodiments relate generally to communications and, more particularly, to a timing advance triggering measurement report for FR2 handover.

BACKGROUND

It is known for a user equipment to execute a handover from a source radio node to a target radio node in a communication network.

SUMMARY

In accordance with an aspect, an apparatus includes at least one processor; and at least one memory including computer program code; wherein the at least one memory and the computer program code are configured to, with the at least one processor, cause the apparatus at least to: establish a connection with a source cell; determine a first timing advance that indicates a propagation delay of uplink transmission to the source cell; determine a second timing advance that indicates a propagation delay of uplink transmission to a target cell; determine whether to initiate a handover procedure to the target cell, based at least on the first timing advance; and synchronize to the target cell during the handover procedure.

In accordance with an aspect, an apparatus includes: at least one processor; and at least one memory including computer program code; wherein the at least one memory and the computer program code are configured to, with the at least one processor, cause the apparatus at least to: establish a connection with a user equipment; transmit, to the user equipment, an update to a timing advance that indicates a propagation delay of uplink transmission from the user equipment; receive, from the user equipment, at least one measurement related to a handover procedure to a target cell from a source cell, based on the timing advance; and determine whether to initiate handover preparation to the target cell, based on the at least one measurement.

In accordance with an aspect, a method includes: establishing a connection with a source cell; determining a first timing advance that indicates a propagation delay of uplink transmission to the source cell; determining a second timing advance that indicates a propagation delay of uplink transmission to a target cell; determining whether to initiate a handover procedure to the target cell, based at least on the first timing advance; and synchronizing to the target cell during the handover procedure.

In accordance with an aspect, a method includes: establishing a connection with a user equipment; transmitting, to the user equipment, an update to a timing advance that indicates a propagation delay of uplink transmission from the user equipment; receiving, from the user equipment, at least one measurement related to a handover procedure to a target cell from a source cell, based on the timing advance; and determining whether to initiate handover preparation to the target cell, based on the at least one measurement.

In accordance with an aspect, a non-transitory program storage device readable by a machine, tangibly embodying a program of instructions executable with the machine for performing operations is provided, the operations including: establishing a connection with a source cell; determining a first timing advance that indicates a propagation delay of uplink transmission to the source cell; determining a second timing advance that indicates a propagation delay of uplink transmission to a target cell; determining whether to initiate a handover procedure to the target cell, based at least on the first timing advance; and synchronizing to the target cell during the handover procedure.

In accordance with an aspect, a non-transitory program storage device readable by a machine, tangibly embodying a program of instructions executable with the machine for performing operations is provided, the operations including: establishing a connection with a user equipment; transmitting, to the user equipment, an update to a timing advance that indicates a propagation delay of uplink transmission from the user equipment; receiving, from the user equipment, at least one measurement related to a handover procedure to a target cell from a source cell, based on the timing advance; and determining whether to initiate handover preparation to the target cell, based on the at least one measurement.

In accordance with an aspect, an apparatus includes: means for establishing a connection with a source cell; means for determining a first timing advance that indicates a propagation delay of uplink transmission to the source cell; means for determining a second timing advance that indicates a propagation delay of uplink transmission to a target cell; means for determining whether to initiate a handover procedure to the target cell, based at least on the first timing advance; and means for synchronizing to the target cell during the handover procedure.

In accordance with an aspect, an apparatus includes: means for establishing a connection with a user equipment; means for transmitting, to the user equipment, an update to a timing advance that indicates a propagation delay of uplink transmission from the user equipment; means for receiving, from the user equipment, at least one measurement related to a handover procedure to a target cell from a source cell, based on the timing advance; and means for determining whether to initiate handover preparation to the target cell, based on the at least one measurement.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings.

FIG. 15 is an example method performed with a user equipment to implement the examples described herein.

FIG. 16 is an example method performed with a network node to implement the examples described herein.

DETAILED DESCRIPTION OF EXAMPLE EMBODIMENTS

Figure 1:
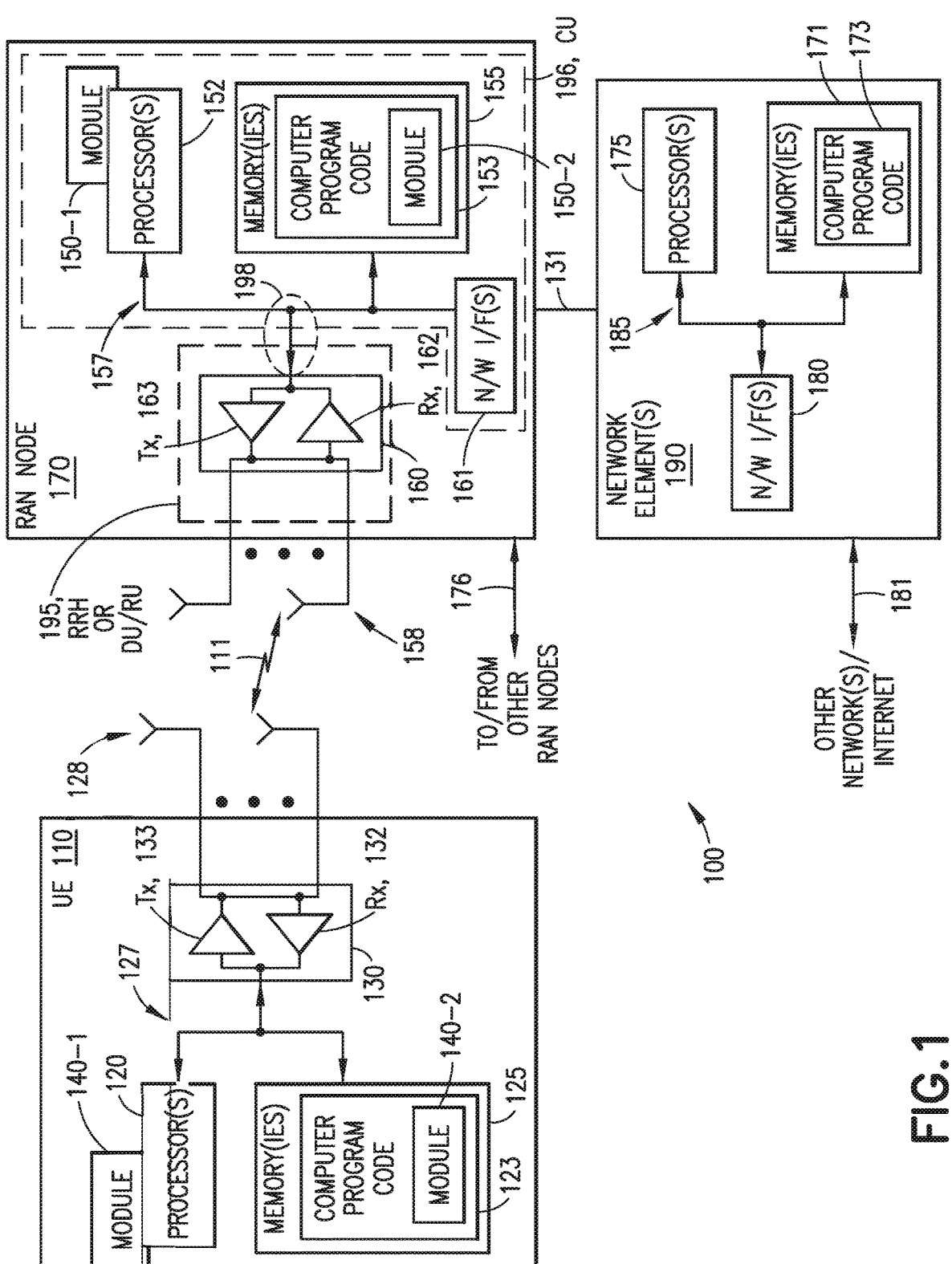
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including a timing advance triggering measurement report for FR2 handover. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein, such as for a target gNB or a source gNB. Computer program code 173 and other elements/features shown in FIG. 1 of network element(s) 190 may be configured to implement network element related aspects of the methods described herein such as for an OAM node.

Having thus introduced a suitable but non-limiting technical context for the practice of the example embodiments, the example embodiments are now described with greater specificity.

Described herein is an enhanced handover procedure that utilizes TA information to avoid extreme TL handovers.

Baseline Handover (A3 Event Based Handover)

In mobile networks, a user equipment (UE) connects to the network through a cell which provides a good link quality, i.e., a link with a signal-to-interference-noise-ratio above a certain threshold. If the UE moves away from the serving cell and gets closer to another neighbor cell, the received signal power of the serving cell degrades and the interference from the neighbor cell becomes dominant.

Eventually, the network handovers the connection of the UE to the neighbor cell to sustain the connection to the network.

The UE measures the serving and neighbor cells and reports this to the serving cell. A received signal power measurement of the serving cell is compared by the serving cell against that of the neighbor cell to determine whether it is necessary to handover the connection of a UE from the serving cell to another cell. The received signal power measurements may fluctuate a lot due to channel impairments, e.g., fast-fading, measurement error and shadow fading. Using the measurements without any filtering may lead to wrong decisions due to rapid fluctuations and uncertainty on the measured signals. To mitigate such impairments and uncertainty (to prevent erroneous decisions) multiple measurement instances are averaged by a moving average filter (L1 filter) and recursive filter (L3 filter) which provides smooth average measurements, also called filtered measurements (e.g., L3 measurements), in exchange for the delay in obtaining the averaged measurements (due to filtering).

Figure 2:
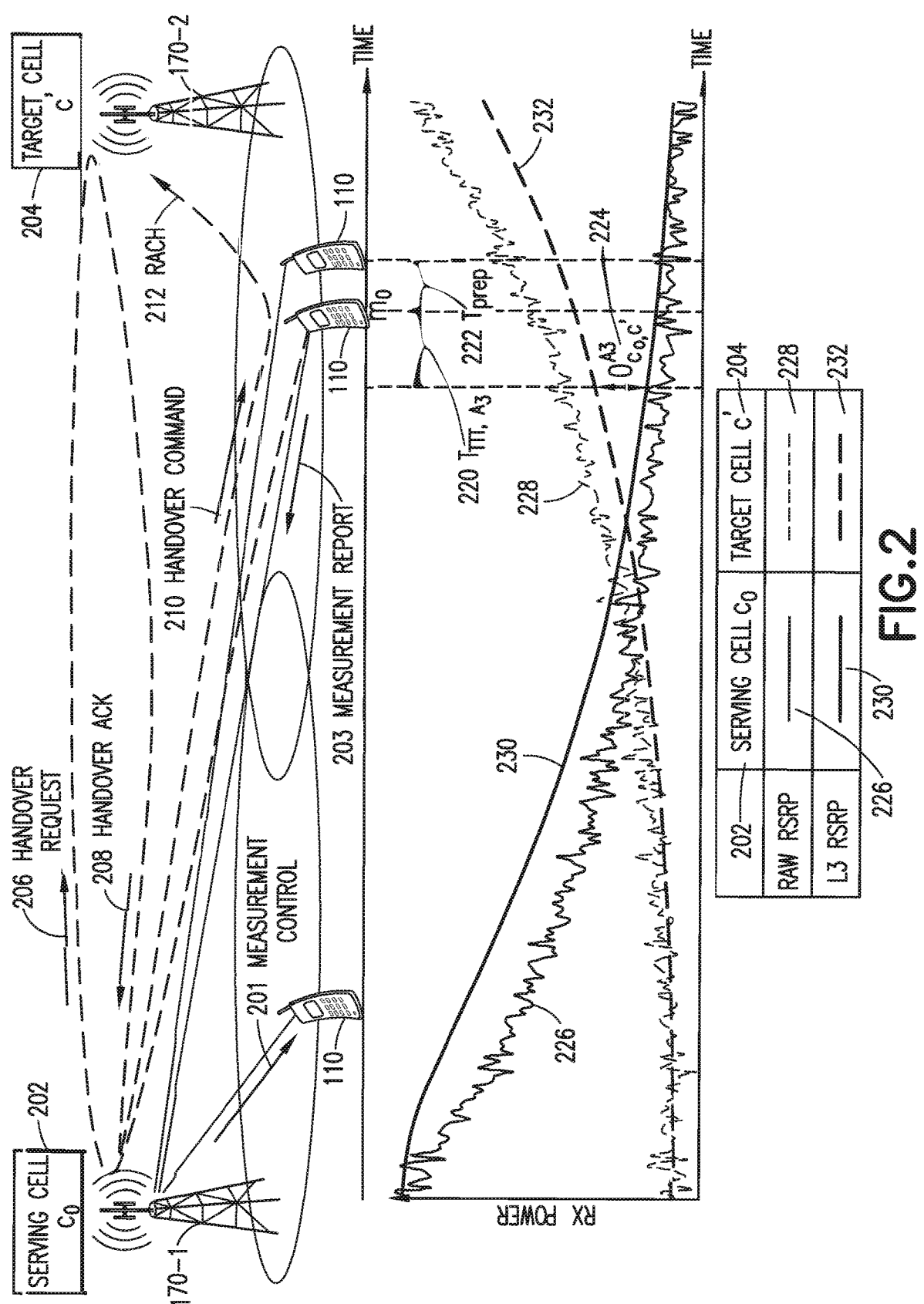
FIG. 2 illustrates an A3 handover scheme.

In FIG. 2 handover of a UE 110 from serving cell $c_0$ 202 to neighbor cell c' 204 is illustrated along with the L3 measurements, including but not limited to L3 RSRP measurement 230 of the serving cell 202 and L3 RSRP measurement 232 of the target cell 204). Initially, L3 measurements (230, 232) from the serving cell 202 and the neighbor cell 204 are compared by the UE 110. Herein, if L3 measurements (232) of a neighbor cell c' 204 is offset $o_{c_0,c'}^{A3}$ 224 dB better than the L3 measurement (230) of the serving cell $c_0$ 202 for the duration of a time-to-trigger period $T_{TTT}$ 220, UE 110 (at time $m_0$) sends a measurement report 203 to the serving cell 202. Serving cell 202 requests a handover (206) from the target cell 204. If the target cell 204 acknowledges the request (208), serving cell 202 sends the handover command (210) to the UE 110. UE 110 initiates the handover with a random access (RACH) procedure (212) right after receiving the handover command (210).

FIG. 2 shows serving cell 202 transmitting a measurement control configuration (201) to the UE 110. FIG. 2 depicts network node 170-1 providing access to serving cell 202, and network node 170-2 providing access to target cell 204. However, network node 170-1 may provide access to both serving cell 202 and target cell 204, or network node 170-2 may provide access to both serving cell 202 and target cell 204. FIG. 2 also shows a plot 226 of the raw RSRP of the serving cell 202, and a plot 228 of the raw RSRP of the target cell 204. The delay between sending the measurement report (203) and receiving handover command (210) includes the preparation time 222.

Timing Advance

In mobile networks, each UE has a different distance to the base station. Uplink transmission of each UE with a different distance from the serving cell would traverse the different distance and arrives at the serving cell with different delays (propagation delay). This is problematic especially in TDMA systems, where the radio resources are separated in time chunks. This propagation delay results in uplink messages of the UEs violating their allocated time chunk. The uplink messages may arrive overlapping with the following time chunk. For this reason uplink transmission of UEs that are served by the same cell should be received in a synchronized manner at the serving cell. A timing advance message is sent from the network to the UE so that the UE sends its uplink message in an "advanced" manner such that it is received at the network at the right time, compensating for the propagation delay.

Figure 3:
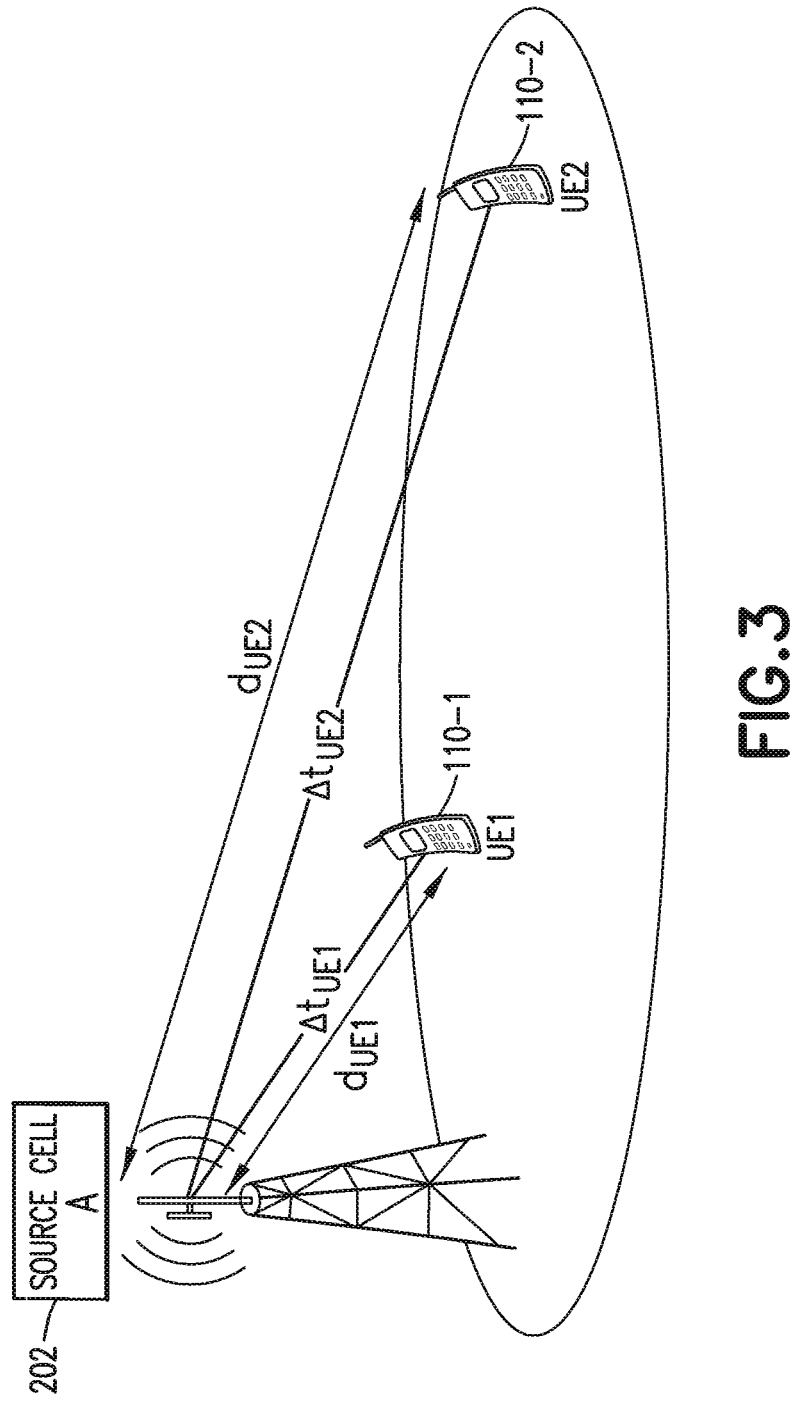
FIG. 3 depicts uplink transmission of a first user equipment and a second user equipment at different distances from source cell A experiencing different propagation delays.

In FIG. 3, UE1 (110-1) and UE2 (110-2) are served by source cell A 202 and are located at different distances ($d_{UE1}$ and $d_{UE2}$ respectively) from the source cell A 202, i.e., UE1 110-1 is close to the source cell A and UE2 110-2 is far away from source cell A 202. In this scenario, the transmission of UE1 travels among the $d_{UE1}$ and it takes $$\Delta t_{UE1} \approx \frac{d_{UE1}}{c}$$

seconds to arrive at source cell A (c is the speed of light since the electromagnetic wave travels almost at the speed of light on air). On the other hand, transmission of the UE2 takes $\Delta t_{UE2}$ seconds which is larger than $\Delta t_{UE1}$ since the distance traversed by transmission of UE2, $d_{UE2}$ is longer than $d_{UE1}$.

Figure 4:
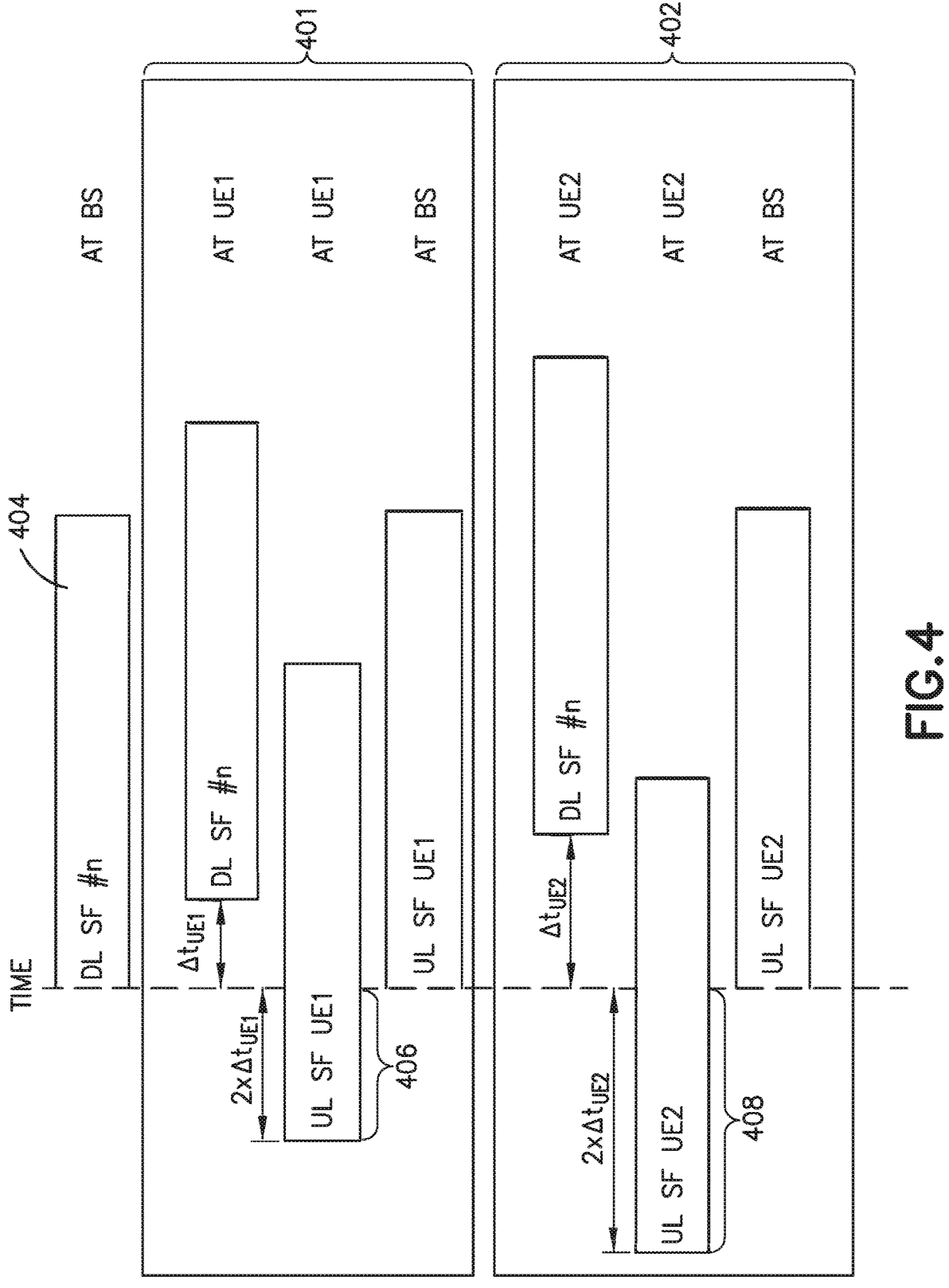
FIG. 4 depicts uplink synchronization of UEs at different distances from a serving cell.

The uplink synchronization of UEs at different distances is achieved by using the concept of timing advance (TA). In FIG. 4, the uplink synchronization of UE1 110-1 and UE2 110-2 are shown respectively as 401 and 402. Initially, the downlink (DL) subframe (SF) #n (404) is transmitted by the base station 170 and this transmission is received by the UE 1 110-1 after $\Delta t_{UE1}$ seconds corresponding to the propagation delay from source cell 202 to UE1. The next uplink (UL) transmission of UE1 should be transmitted $2\times\Delta_{UE1}$ in advance (406), where $2\times\Delta_{UE1}$ corresponds to the round trip delay, such that the UL transmission is received at the source cell with the desired timing. The same also applies for the UE2 where the UE2 applies a different TA (408) on the UL transmission since the propagation delay of UE2, $\Delta_{UE2}$ is different than that of UE1. Considering that both UEs apply the timing advance (406, 408) on UL transmission, those transmissions are received synchronously at the same cell 202.

In 3GPP 38.211 Section 4.3.1, the TA is defined as $$T_A = (N_{TA} + N_{TA,offset})T_c$$

where $N_{TA}$ is the measured timing advance value by the base station that is sent to the UE as part of a timing advance command (TAC). $N_{TA,offset}$ are fixed values that vary according to different frequency bands and subcarrier spacing and $T_c$ is known as the basic time unit for the 5G NR system (0.509 ns).

In FR2, for 120 kHZ subcarrier spacing systems, the $T_A$ adjustment step size can be up to 9.77 meters which means that the network updates the timing advance $T_A$ for every 9.77/2=4.88 meter change in the distance that the signal traverses between the UE and cell in one way.

The delay between the UE sending the measurement report and the UE receiving the handover command is around 50 ms. During that 50 ms, the link quality of the serving cell and the target cell does not change much and finding an optimum point in time to decide handover is not a trivial task due to the "early-but-late" dilemma as explained below:

Handover should be executed early so that the link between the UE and the serving cell is strong enough for UE to deliver the measurement report and receive the handover command. If the handover is triggered "Too Late (TL)", the UE either fails to deliver the measurement report or receive the handover command. Eventually, the UE cannot handover to the target cell and is likely to fall into radio link failure soon.

Handover should be executed late so that the link between UE and the target cell is strong enough (secure RACH towards target). If the handover is triggered "Too Early (TE)" before the link of the target is not strong enough, the UE fails to complete the RACH/handover, or it completes the RACH/handover and falls into a radio link failure shortly after.

Considering the "Too Early (TE)" and "Too Late (TL)" issues above, the goal is to find an optimum point in time to decide on handover which is early enough to secure communication with the source cell and late enough to secure RACH towards the target cell.

The network can configure a cell pair specific handover offset for each cell border to fix "Too Early (TE)" and "Too Late (TL)" handover problems with configuring a small cell individual offset for cell borders with "Too Early (TE)" handovers. This triggers handovers late enough so that the target cell power is stronger when handover is initiated. This may be the case e.g. with slow UEs. Configuring a large cell individual offset for cell borders with "Too Late (TL)" handovers similarly triggers handovers earlier and the UE initiates handover before link quality between the serving cell and the UE becomes degraded. This may be the case e.g. with fast UEs.

In frequency range 2 (FR2, higher frequency band that is used in 5G), the "Early-but-late" dilemma is more pronounced due to more rapid signal degradations, especially if the UE gets closer to the cell edge where beamforming gain decreases and path loss increases simultaneously. In addition, the impact of shadow fading due to blockage of the signal by large objects is more pronounced on the cell edge (also as modeled and described in 3GPP 38.901 NR channel modeling). Under these circumstances, "Too Late (TL)" handovers are observed frequently since link quality between the UE and the network degrades quickly and the link fails before the UE sends the measurement report (too late to send the measurement report). Fixing those TL handovers with a larger handover offset is not a feasible solution since it uses an exceptionally large offset configuration which causes a high number of TE problems to be observed on other areas of the same cell border without solving the TL handover problems.

Figure 5A:
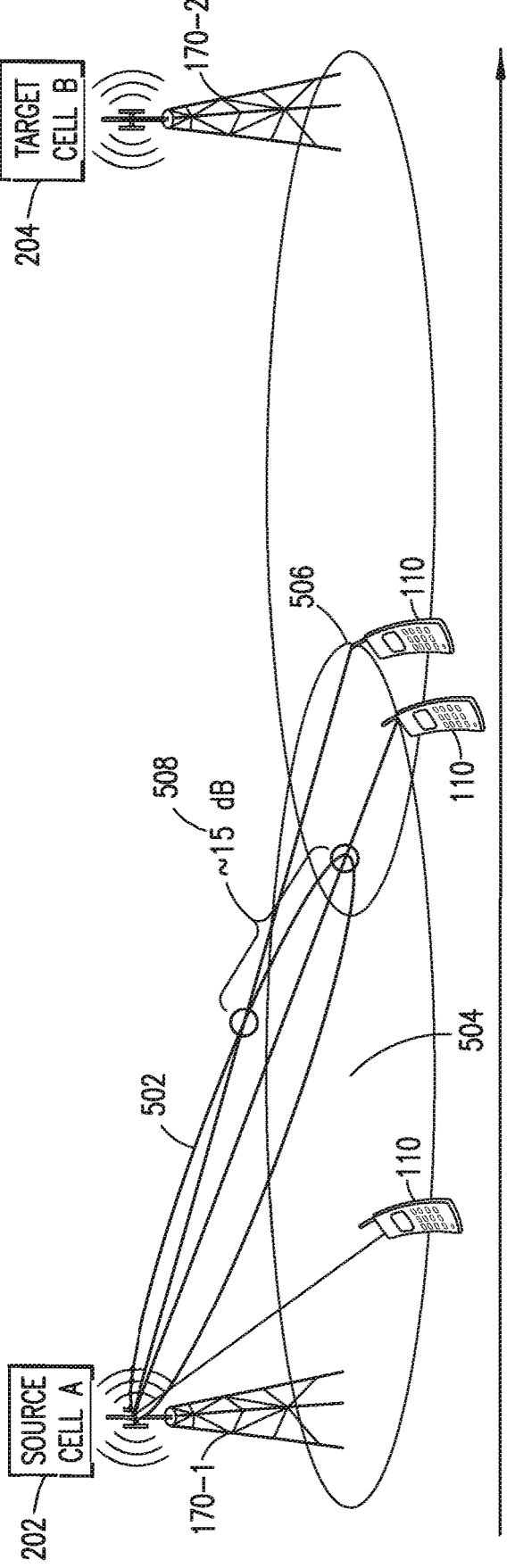
FIG. 5A depicts an example mobility scenario for a UE moving from the cell center towards the cell border along with the serving beam.
Figure 5B:
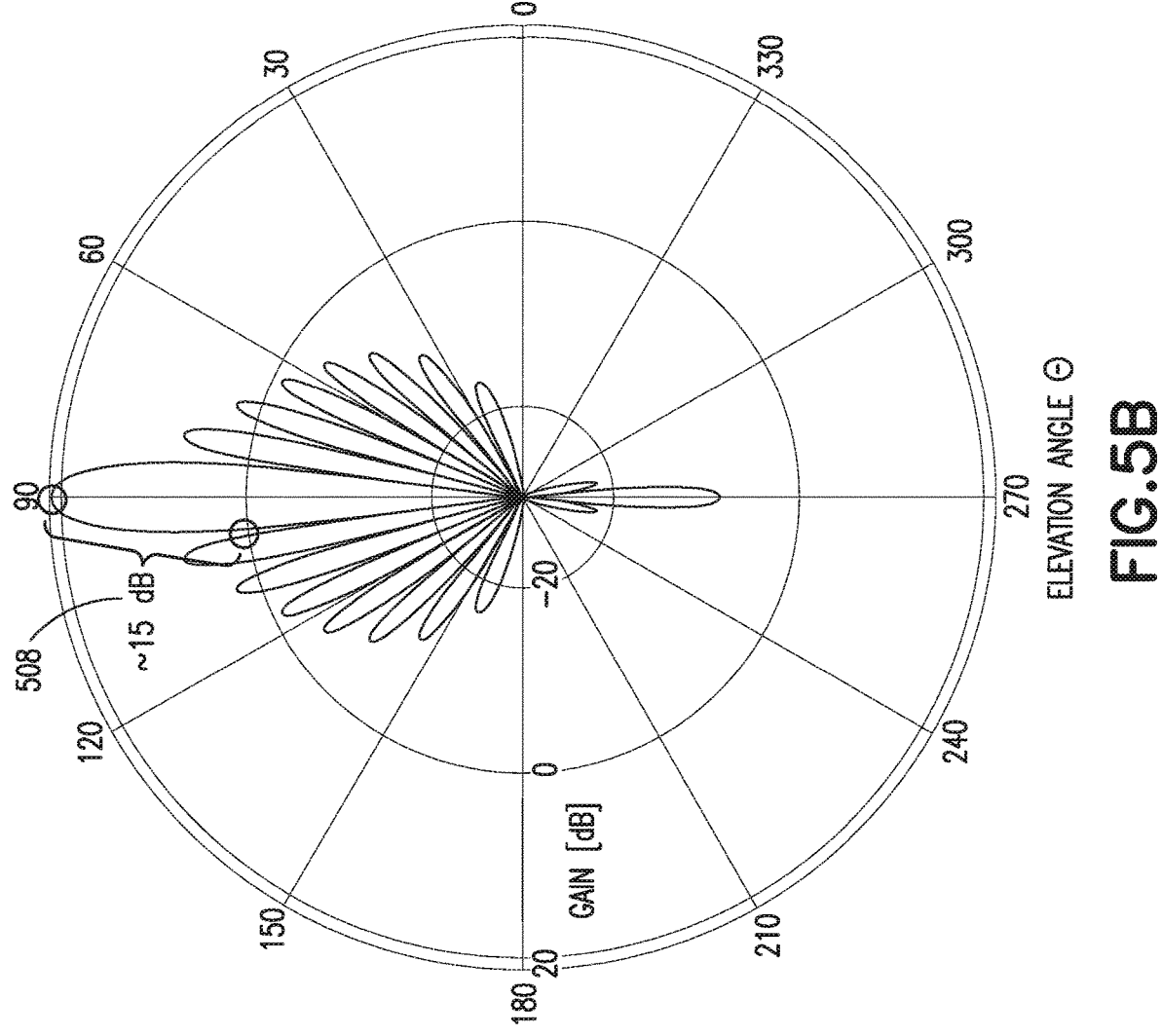
FIG. 5B depicts the elevation pattern of the serving beam of the mobility scenario shown in FIG. 5A.

FIG. 5A and FIG. 5B show an example FR2 mobility scenario, related to mobility management in 5G beamformed systems. In FIG. 5A, a UE 110, served by source cell A 202, moves from cell center 504 towards cell border 506 and is served by a beam (502). FIG. 5B shows the elevation pattern of the beamforming gain that is formed by a 16×8 antenna panel (~21 dB gain on boresight). When the UE 110 moves from the cell center 504 towards the cell edge 506 on the given trajectory in FIG. 5A, the path loss increases due to the increased distance between UE 110 and source cell A 202. On the other hand, the beamforming gain increases as the angle of departure (AoD) increases and the UE moves towards the boresight of the beamforming gain. Eventually, the signal degradation caused by the path loss is compensated by the beamforming gain so that the UE reference signal received power (RSRP) measurements do not decay with increasing distance between serving cell 202 and the UE 110. However, when the UE 110 continues to move towards target cell 204, beamforming gain also decreases for increasing distance since the AoD would increase beyond the boresight of the serving beam 502 (see FIG. 5A and FIG. 5B, 15 dB decrease in a short distance (referring to item 508)). Ultimately, both decrease in beamforming gain and the increase in beamforming gain loss leads to a sharp degradation in RSRP measurements on the cell edge.

Figure 6:
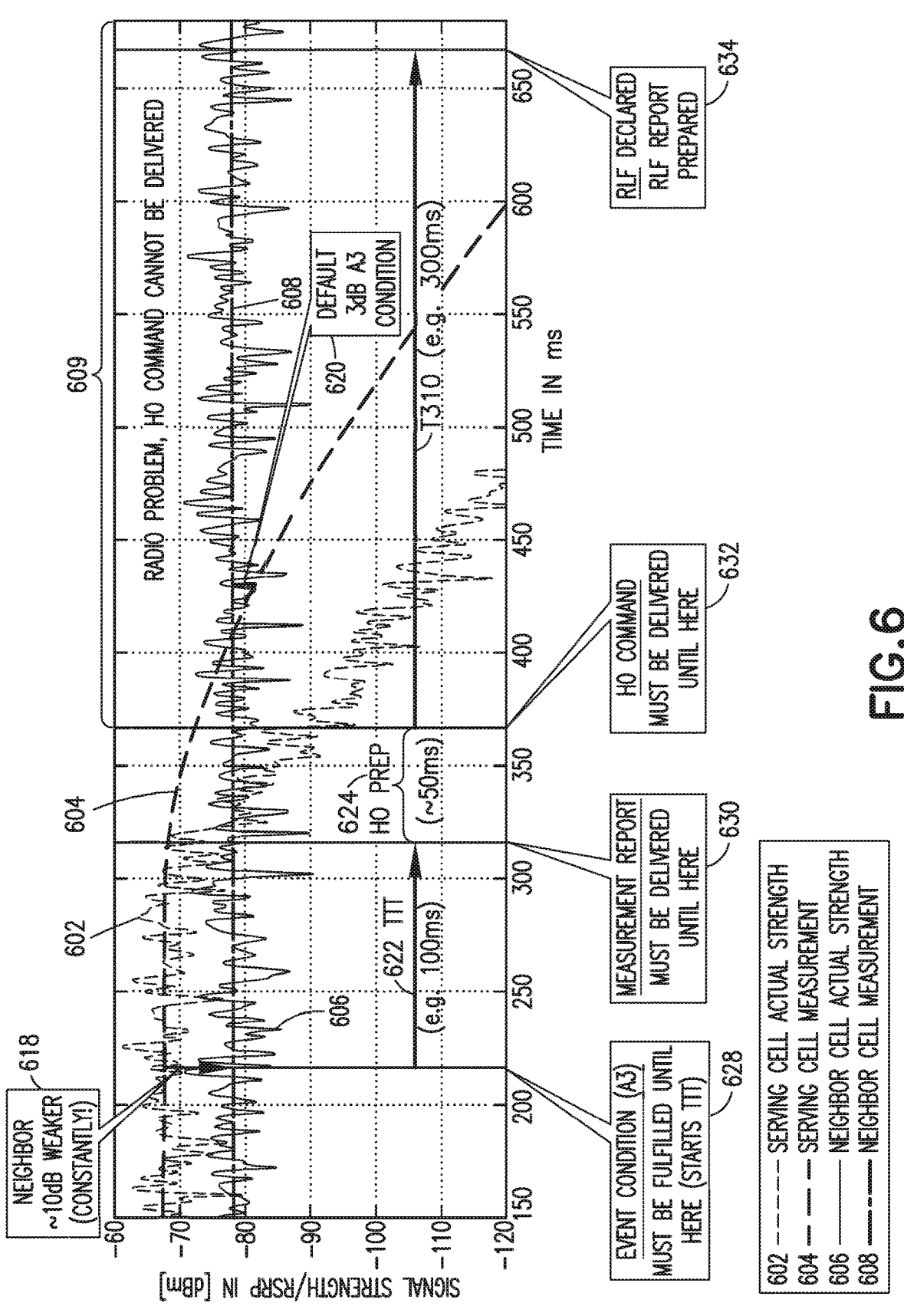
FIG. 6 depicts a too late (TL) handover scenario that uses an extremely large handover offset (e.g. 10 dB).

Considering the channel characteristics shown in FIG. 5A and FIG. 5B and explanations above, the aforementioned TL handover problem is illustrated in FIG. 6, which has been observed in sophisticated system level simulations in many cases, i.e., it is not a corner case. In this example, the serving and target cell measurements are shown as (602, 604) and (606, 608), respectively, where the solid line shows the actual strength (raw RSRP measurements) (602, 606) and dashed line shows the L3 filtered RSRP measurements (604, 608).

The area denoted by 609 of FIG. 6 shows the time interval where the link between UE 110 and the serving cell 202 is interrupted due to low link quality (serving cell signal is drowning in interference of the target cell signal). This means the UE cannot send the measurement report and/or receive the handover command anymore. When the UE detects such a radio problem, it starts a timer (T310) during which it tries to recover the serving cell 202. The start of T310 and the start of area 609 (where UE cannot send the measurement report and/or receive the handover command) does not exactly coincide, but can be assumed to be very close.

Initially, the serving cell measurements do not decay although the UE 110 moves away from the serving cell 202 (although the path loss increases) since the beamforming gain compensates the path loss that increases with increased distance between UE 110 and the serving cell 202. When the UE moves away further, actual RSRP of the serving cell decreases rapidly due to increasing path loss, decreasing beamforming gain and shadow fading on the cell edge (as also explained previously). L3 measurement cannot follow the raw measurement due to filtering delay which is around 100 ms (refer to the difference between plot 604 and plot 602 after t=300 ms). And the handover condition is only satisfied after the link between the serving cell and the UE is already too weak to allow delivery of the measurement report or handover command (high interference from neighbor and weak signal from serving), i.e. the handover cannot be initiated by the network. The link is interrupted for longer than T310 ms and after the T310 expiry, the UE 110 declares radio link failure (RLF) 634. After that UE 110 re-establishes to the target cell 204.

In the best case scenario (to achieve successful handover through signaling before area 609), the handover condition should be configured such that it would be satisfied before t=220 ms (at 628) and it would be satisfied for $T_{TTT}$=100 ms (622). Then, the measurement report is sent around t=320 ms (right after $T_{TTT}$ expires, at 630). After a 50 ms preparation delay (624), the network would deliver the handover command (at 632) to the UE 110 just before the link is interrupted (around t=370 ms) so that the UE 110 could execute the handover towards target cell 204. However, in this best case scenario, the condition that is assumed to be satisfied (target 204 is still 10 dB weaker than source 202) would already be satisfied a long time before ~t=210 ms. This would shift the procedure back in time and cause early triggering of handover. That eventually would lead failure of the handover due to low target link quality. As a conclusion, such a problem cannot be fixed with today's handover triggering mechanisms. Also shown in FIG. 6 is the default 3 dB A3 condition (620), or the difference between neighbor cell measurement and the serving cell measurement, and that initially (e.g. at time 150 ms and at 618), the neighbor cell (204) is weaker than the serving cell 202 by approximately 10 dBm.

There are also UEs in the same cell border that are moving from an open area to the left which also handover from the serving cell 202 to the target cell 204. The signal between the serving cell and the UEs would degrade slower than the scenario described above due to smoother angular view. Configuring a reasonably small cell individual offset between serving cell 202 and target cell 204 would ensure successful handover of those UEs. These UEs would perform well (i.e. without failures) with default parameters. These UEs may suffer significantly from bad mobility performance, i.e., TE handovers, if larger cell individual offsets, i.e., 10 dB, are configured.

Considering the existence of different types of UEs and handovers at the cell border, these types of too late handovers shown in FIG. 6 are called "extreme TL" handovers since increasing the handover offset would not solve the extreme too late handovers but causes too early handover problems. In those cases, the network should not adjust the handover offset to solve those "extreme TL" handovers, otherwise, it would cause more "TE" handovers and eventually cause more link failures.

Issue: extreme TL handovers are a new type of failure in FR2 mobility scenarios that currently do not have a solution. Extreme TL HOs are to be a part of release 19 mobility candidate enhancements proposals.

This problem is new in FR2. Due to the better (smoother) propagation effects and smoother beamforming gain, extreme too late handovers have not been seen before in FR1. Increasing the cell individual offset when too late handovers were dominating has always improved the too late handovers much more than it was degrading the too early handovers.

Mobility Robustness Optimization (MRO)

The conventional MRO (Rel9) assumes that the re-established cell after RLF is the candidate that the UE should have performed handover to (assuming too late handover to re-established cell). This is further improved in Rel10 MRO with the RLF report where more information or measurements are added to the RLF report to be used for root cause analysis. When an RLF happens, the UE stores some information (e.g., available measurements) into an RLF Report and indicates the availability of such a report to the network during the re-establishment process. The network can retrieve this RLF report and use its content to analyze the mobility problems. This allows also "offline" MRO purely based on the information in the RLF report. This offline MRO does not necessarily have to be done right after re-establishment in the target/serving node, it can also be done in another entity collecting data over a longer time (e.g. a trace collection entity).

Figure 7:
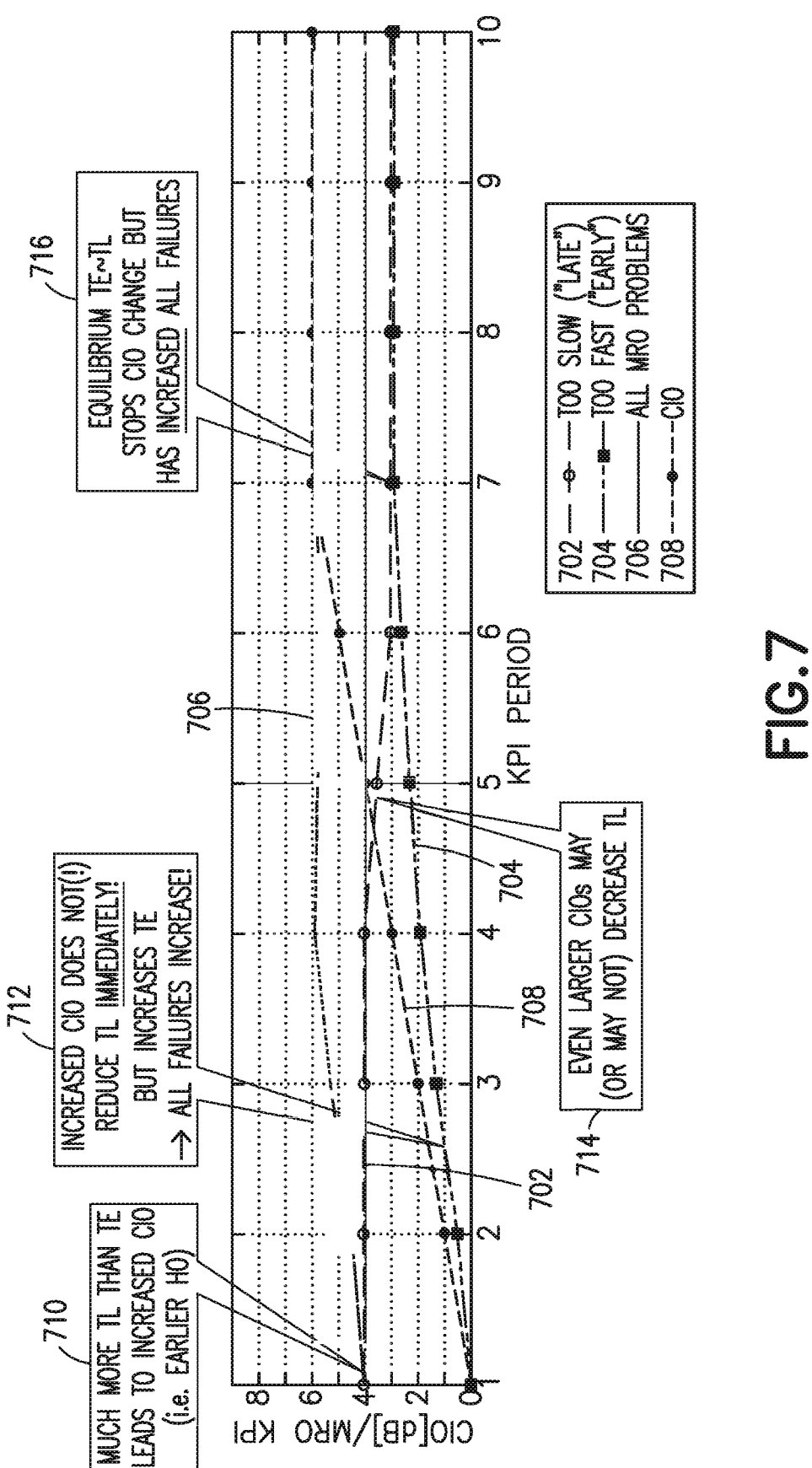
FIG. 7 depicts FR2 mobility robustness optimization (MRO) updates to one or more cell individual offsets (CIOs) over KPI periods.

Considering the re-established cell after RLF and content of the existing RLF report, too late handovers that are observed in FR2 are not further distinguished. Eventually root-cause analysis attempts to solve the "extreme too late" scenario (which is in vain) which can jeopardize other successful handovers (turning them into too early handovers for the sake of too late treatment). In FIG. 7, an MRO example of one specific cell boundary (such as the cell boundary shown in FIG. 5 and FIG. 6) is illustrated for the FR2 scenario that pronounce the "extreme too late" scenario that degrades MRO performance. Here, MRO collects too early events (704) and too late events (702) for each key performance indicator (KPI) period (could be minutes or days) and adjusts the cell individual offset (CIO, 708) to reduce the total number of problems (TL handovers and TE handovers, shown with 706). As it is shown in FIG. 7, "TL" handovers are significantly dominant at the beginning (710) of the optimization process (where CIO 708 has its default of 0 dB). The MRO intuitively increases the CIO offset 708 to overcome TL handover problems, however those TL handovers that are reported to the MRO algorithm cannot be mitigated by increasing the CIO offset since they are extreme as explained in FIG. 6. Instead, it causes some of the successful handovers to fail in the FR2 scenario (TE handovers increase due to the larger CIO offset).

Accordingly, FIG. 7 shows at 710 there are much more TL than TE which leads to increased CIO (i.e. earlier HO). At 712, increased CIO does not reduce TL immediately but rather increases TE such that all failures increase. At 714, even larger CIOs may or may not decrease TL. At 716, equilibrium TE to be approximately equal to TL stops CIO change but has increased all failures.

Figure 8:
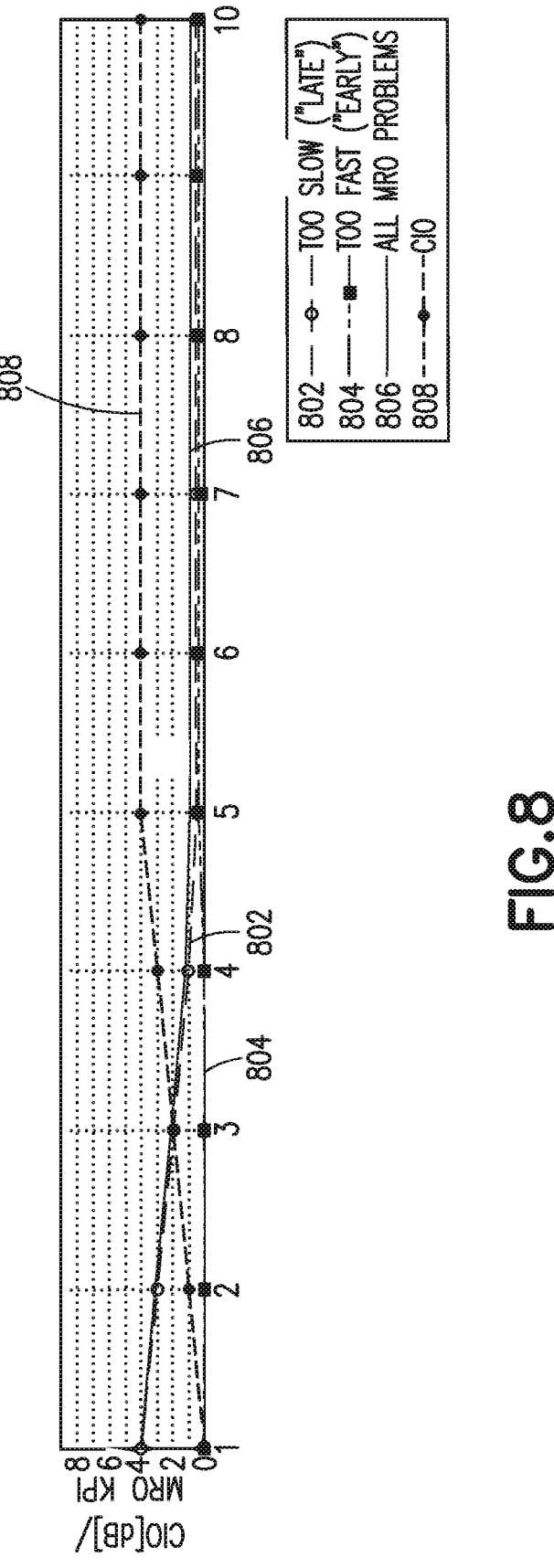
FIG. 8 depicts FR1 mobility robustness optimization (MRO) updates to one or more cell individual offsets (CIOs) over KPI periods.

It is worth to emphasize again, that the nature of the FR1 propagation conditions in LTE and former systems did not cause these extreme delays and increasing CIO could always improve too late problems more than it degraded too early problems (see FIG. 8). So the MRO paradigms used so far are well suited to the FR1 scenarios but not to FR2 scenarios. In FIG. 8, plot 802 plots "Too Slow" or "late" events, plot 804 plots "Too Fast" or "Early" events, plot 806 plots all MRO problems, and plot 808 plots the CIO.

Conditional Handover (CHO)

In conditional handover (CHO), the target cell can be prepared earlier than the link between the serving cell and the UE has failed. This would let the UE execute handover in those "extreme too late" cases since successful handover is not dependent on the UE-serving cell link after preparation is completed. Although CHO looks like a promising option, the following problems cannot be overcome in mobile networks because of the following reasons:

1. CHO is a feature that is not supported by all network nodes (and not by all UEs). In the case that CHO is not available, the network would operate with the baseline handover scheme and cannot solve the "extreme TL" problem with legacy methods.

2. Even if the CHO feature is available, preparation of the target cells may lead to extremely early preparation. In the previously described example, the CHO preparation condition has to be fulfilled at T=220 ms (just as the HO condition), where the target is 10 dB weaker. However, this condition is fulfilled significantly earlier, i.e. in this scenario it is not possible to determine a reasonable point in time for preparation. This leads to extremely (unreasonably) long CHO preparation and blocks network resources inefficiently.

A timing advance may be determined during handover. In particular, a method of handover between two cells of a time division multiple access (TDMA) cellular mobile radio network may be implemented, wherein, after a UE receives a handover command from its serving cell, the UE transmits a message containing connection set-up information or wanted data to a target cell according to a timing advance. The timing advance may be measured against the target cell and used to reduce the service interruption during access to target cell. Timing advance may be used for a target cell for avoiding use of a random access procedure to obtain timing advance.

The timing advance may be adjusted autonomously during handover. An uplink synchronization method during handover may be implemented, where the serving cell calculates the relative timing difference between the UE-serving cell and the UE-target cell, which is sent to the UE. The source cell does more frequent calculation of the aforementioned value during handover to improve the accuracy of the timing advance between the UE and the target cell.

A connection between a base station and mobile station may be established, where a pre-configuration of the UE timing advance towards the target cell may be such that when the UE handovers to the target cell the UE starts using the pre-configured timing advance to synchronize seamlessly.

Accordingly, described herein is a TA-based solution for handover failure. As the problem occurs before the UE sends a measurement report or receives a handover command, the solution applies after the UE receives the HO command.

Event Based Measurement Report

In 3GPP 38.331 section 5.5.4 (https://www.3gpp.org/ftp/ Specs/archive/38_series/38.331/38331-h00.zip), various measurement report triggering events are defined, i.e., A1, A2, A3, A4, A5, A6, B1, B2, I1, C1, C2. Those events are used to trigger the measurement reporting from the UE to serving cell such that the handover procedure is initiated. Those events are based on various type of RSRP measurements from either the serving cell, the non-serving cell or both cells. The UE compares those measurements against each other or against a threshold. Depending on the thresholds and triggers, if the condition defined in the event is satisfied, the UE reports the pre-defined measurements and the handover procedure is initiated. As mentioned before, RSRP based measurements lead to extreme TL handovers since the rapid signal degradations cannot be detected before the link between the UE and serving cell is interrupted which leads the UE to fail on delivering the measurement report.

Network Operation

The network sends the timing advance command to the UE. The network is aware of the timing advance of the UE. The network is also aware that the timing advance of the UE reached a level where the UE is at or near the cell edge. However, timing advance maintenance and the received signal strength reporting are currently independent procedures. Once the network determines a handover is to be triggered only monitoring the timing advance, the network may not know which cell to handover the UE to as the network may not have the RSRP measurements from the UE.

Issue: currently, RSRP measurement reporting and timing advance procedures are not linked and the network may not be aware of the potential cell when the timing advance reaches a certain value.

Thus, described herein is an enhanced handover procedure that utilizes the TA information to avoid extreme TL handovers.

As mentioned, TA is proportional to the distance between UE 110 and the serving cell 202. Whether the UE is close to the cell border or in the cell edge can be estimated using the TA information.

Compared to RSRP based measurement events, which indicates path loss for a link, the idea described herein is to use TA, which indicates propagation delay, to initiate the handover procedure. Large TA indicates that the UE is close to the cell edge.

The herein described enhanced handover procedure can be enhanced with a standalone timing advance based event. This would be similar to the aforementioned measurement based measurement report triggering events or can be incorporated with those existing events. There are four different enhancement alternatives for the herein described enhanced handover procedure using TA information.

Solution 1—TA based measurement report triggering event (solution to issue): In this method, network configures UE with TA based measurement triggering event with the RRC configuration. UE monitors the configured TA event and compares TA against a TA threshold. If the event occurs, i.e., TA becomes greater than configured TA threshold for a configured period of time, the UE 110 triggers the measurement report to initiate the handover procedure.

Solution 2—TA assisted measurement report triggering event (solution to issue): In this method, the aforementioned report triggering parameters are adjusted by using the TA value. The serving cell configures the UE via RRC configuration in a way such that parameters of the aforementioned events are scaled with the TA value, e.g., in the A3 event, when the UE gets closer to the cell edge, the TA increases and the UE 110 scales down the handover offset, and scales up the TTT. Hence, the measurement report triggering event conditions are satisfied before the link between UE cell edge UEs and the serving cell is interrupted.

Solution 3—TA based RRC Reconfiguration HO parameter update network implementation (solution to issue): In this alternative, the network updates the handover parameters via RRC Reconfiguration when the change in the TA should result in a handover parameter update, e.g., when the TA increases (UE 110 gets closer to cell edge), the network reconfigures the UE with a larger handover offset and shorter TTT so that UE triggers measurement report earlier. This solution comes with an extra signaling cost and possible delay for the configuration of the UE.

Solution 4—TA based measurement report request (solution to issue): When the TA value increases, the network requests the UE 110 to report measurements immediately and the UE reports the requested measurements as soon as it receives the measurement report request.

In one embodiment, the TA based measurement reporting condition (implemented in Solution 1) can be configured together with one of the other types of measurement reporting triggering conditions (dual event), e.g., RSRP, RSRQ or SINR based conditions that are either defined as comparison of two cell quality metrics against each other with an offset, or self comparison against a threshold.

The UE indicates to the network node/base station whether the UE supports a "HO based on timing advance evaluations/conditions"; the network node/base station indicates to a "neighbor" network node/base station whether the network node supports a "HO based on timing advance evaluations/conditions".

There are four alternative solutions that are listed. The signaling diagram and detailed descriptions are given below.

Solution 1—TA Based Measurement Report Triggering Event

Figure 9:
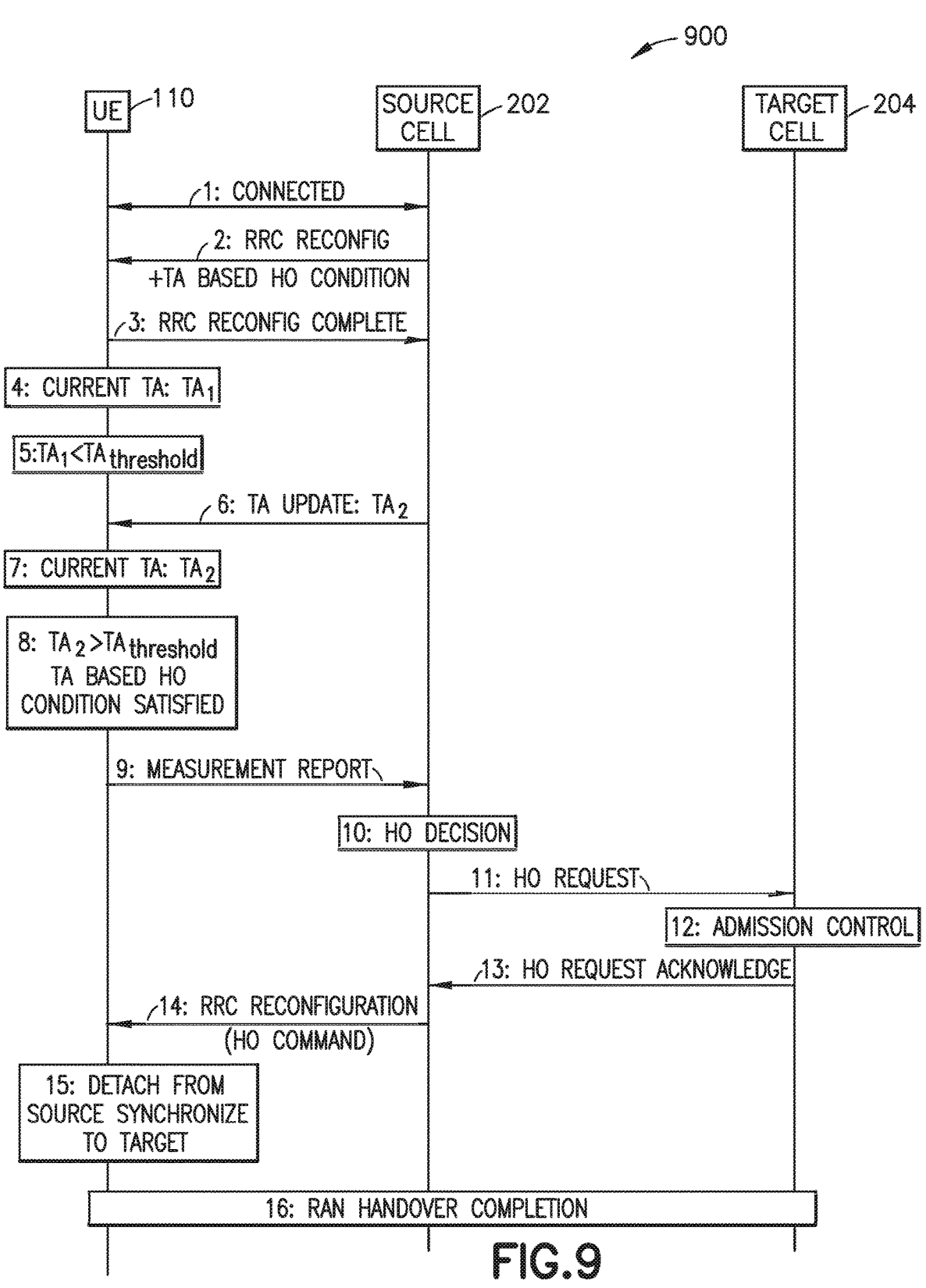
FIG. 9 depicts a signaling diagram for a TA based measurement report triggering event (solution 1).

FIG. 9 shows the signaling diagram 900 for a TA based measurement report triggering event as solution 1. FIG. 9 depicts actions performed by the UE 110, source cell 202, and target cell 204. Steps are explained as follows:

1. UE 110 is connected to source cell 202 and served by this cell.

2. Source cell sends the RRC Configuration message to configure UE 110 on target cell measurements and report triggering conditions.

2a. Source cell includes the TA based HO condition (or measurement report triggering event) in the RRC Configuration message to configure UE for triggering the measurement reports if the condition is satisfied. The TA based HO condition can be $$T_{TA} > TA_{threshold} \text{ for } TTT \text{ seconds} \tag{1}$$

or $$T_{TA,s} + TA_{threshold} > T_{TA,t} \text{ for } TTT \text{ seconds} \tag{2}$$

where $T_{TA}$ is the timing advance on the UE that is updated when the distance between the UE and the serving cell changes. In case the UE is capable of measuring TA of both serving cell s and any target cell t, then the $T_{TA,s}$ and $T_{TA,t}$ are the serving and target cell 204 timing advances, respectively. $TA_{threshold}$ is the TA threshold where the TA of the UE is compared against that threshold. TTT is the time-to-trigger, where the measurement report is triggered when the defined conditions in (1) or (2) are satisfied for TTT seconds (to avoid false alarms, wait before triggering). $TA_{threshold}$ and TTT are the parameters that are defined by the network to determine the condition characteristics. The first condition described above is purely based on the timing advance. In the second condition, introducing the target cell timing advance improves the diversity of the TA condition.

2b. Source cell 202 configures UE 110 to report target cell measurements when the TA based HO condition is met.

3. UE 110 sends the RRC Reconfiguration complete message to the network.

4. UE UL is synchronized to the serving cell and the TA that UE 110 is using is $T_{TA}=TA_1$.

5. UE 110 monitors the configured TA conditions, e.g., condition (1) or (2) above. In this step, the TA of the serving cell is too small to meet the TA condition, so UE 110 does not trigger the measurement report. Thus is step 5, the UE 110 determines whether $TA_1 < TA_{threshold}$.

6. UE 110 moves away from the source cell and UL transmission requires re-synchronization due to increased distance and propagation delay between UE 110 and the source cell. Source cell 202 sends the TA update, $T_{TA}=TA_2$ to UE.

7. UE 110 applies the new TA, $TA_2$, and synchronizes on UL.

8. UE evaluates the TA based HO condition, $TA_2 > TA_{threshold}$. The condition is met for TTT seconds (UE 110 is close to target cell 204 enough such that the TA based condition is satisfied), and UE 110 triggers the measurement reporting to initiate the HO procedure before falling into an extreme TL HO case.

9. UE 110 sends the measurement report to source cell 202. In RRC Config (step 2), the network configures UE 110 to include the target beam measurements when the TA condition is met. Therefore, UE 110 reports the target beam measurements along with the other measurements requested by source cell 202. Those target beam measurements are needed on target cell 204 to determine the prepared beam (CBRA/CFRA) along with the cell preparation.

10. Source cell 202 decides to initiate handover preparation of target cell 204 based on the reported measurements.

11. The source cell sends the HO request to target cell 204.

12. Target cell 204 carries admission control before approving the handover request.

13. Target cell 204 prepares beams for the requested HO (for the UE to perform RACH on one or more beam(s)) and sends the HO Request Acknowledgement message which includes the beam preparation related configurations.

14. The source cell 202 configures UE 110 for HO towards target cell 204 by sending the RRC Reconfiguration.

15. Upon receiving the RRC reconfiguration, UE 110 detaches from source cell 202 and initiates the HO towards target cell 204.

16. Handover of the UE from source 202 to target cell 204 is completed.

As explained above, the UE triggers the measurement report to initiate the handover procedure which can be performed irrespective of the RSRP measurements. In extreme TL handover cases, the measurement report was triggered based on RSRP measurements which was misleading in FR2 beamformed systems due to constant RSRP measurements which rapidly decreases when UE 110 moves towards the cell edge. Here, the described solution triggers the measurement reports independently, i.e., RSRP measurements are not used, hence the extreme TL handover cases are avoided.

Solution 2—TA Assisted Measurement Report Triggering Event

Figure 10:
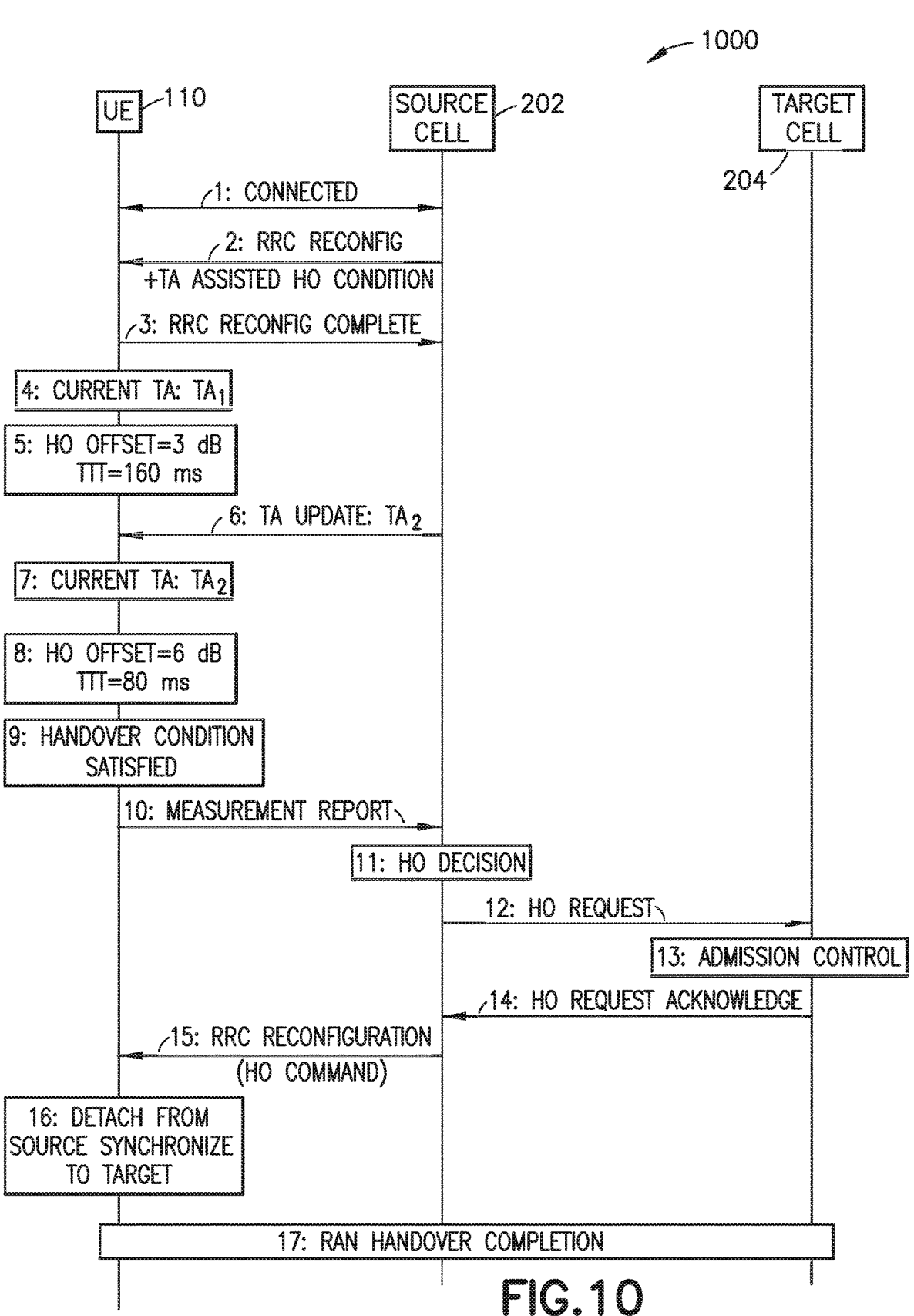
FIG. 10 depicts a signaling diagram for a TA assisted measurement report triggering event (solution 2).

FIG. 10 shows the signaling diagram 1000 for the TA assisted measurement report triggering event solution. The described solution enhances the existing measurement report triggering events by using the TA information and updating the handover parameters accordingly. FIG. 10 depicts actions performed by the UE 110, source cell 202, and target cell 204. Steps of solution 2 shown within FIG. 10 are explained below.

1. UE 110 is connected to source cell 202 and served by this cell.

2. Source cell 202 sends the RRC Configuration message to configure UE 110 for target cell 204 measurements and report triggering conditions.

2a. Source cell 202 configures UE 110 to update the HO parameters, e.g., handover offset o, TTT $T_{TTT}$, L3 filter coefficient k, etc., by using the TA. In an example scenario, where the network configures UE 110 with an A3 event and L3 filter time constant k, then the TA assisted configuration scales the parameters as $$o_{new}^{A3} = o_{old}^{A3} \times T_{TA,new} \times W_{TA,offset}, \tag{3}$$

$$T_{TTT,new} = T_{TTT,old} \times \frac{1}{T_{TA,new}} \times w_{TA,TTT}, \tag{4}$$

$$k_{new} = k_{old} \times T_{TA,new} \times w_{TA,k}. \tag{5}$$

As it is shown in equations 3, 4 and 5, TA is used to scale the mobility parameters. The additional weight is also used to control the impact of the timing advance on the scaling of each parameter. Hence, the mobility parameters are scaled up or down when TA is updated. In an alternative embodiment the network can configure the UE with conditional mobility parameters with specific mobility parameter values. The condition can be tied to specific TA values.

2b. Source cell 202 configures UE 110 to report target cell measurements when the HO condition is met.

3. UE sends the RRC Reconfiguration complete message to network.

4. UE UL is synchronized to the serving cell and the TA that UE is using is $T_{TA}=TA_1$.

5. When the TA is acquired, UE 110 updates the HO parameters by using the methods configured in Step 2 (described in equation 3, 4, 5).

6. UE 110 moves away from the source cell and UL transmission results in re-synchronization due to increased distance and propagation delay between UE 110 and the source cell. Source cell 202 sends the TA update, $T_{TA}=TA_2$ to UE 110.

7. UE 110 applies the new TA, $TA_2$, and synchronizes on UL.

8. When UE TA is updated, UE re-evaluates the HO parameters as configured in step 2 (described in equations 3, 4, 5). Since the UE moves away from source cell 202 and TA increases, the handover offset is scaled up from 3 to 6 dB and TTT is reduced from 160 ms to 80 ms such that the A3 condition can be met earlier and the UE can trigger measurement reporting before falling into an extreme TL handover case.

9. The handover condition is satisfied for the UE 110.

10. UE 110 sends the measurement report to source cell 202. In RRC Config (step 2), the network configures UE 110 to include the target beam measurements when the HO condition is met. Therefore, UE 110 reports the target beam measurements along with the other measurements requested by source cell 202. Those target beam measurements are needed on target cell 204 to determine the prepared beam (CBRA/CFRA) along with the cell preparation.

11. Source cell 202 decides to initiate handover preparation of target cell 204 based on the reported measurements.

12. The source cell sends the HO request to target cell 204.

13. Target cell 204 carries admission control before approving the handover request.

14. Target cell 204 prepares beams for the requested HO (for the UE to perform RACH on one or more beam(s)) and sends the HO Request Acknowledgement message which includes the beam preparation related configurations.

15. The source cell configures UE 110 for HO towards target cell 204 by sending the RRC Reconfiguration.

16. Upon receiving the RRC reconfiguration, UE 110 detaches from source cell 202 and initiates the HO towards target cell 204.

17. Handover of the UE from source 202 to target cell 204 is completed.

Solution 3—TA Based RRC Reconfiguration (HO Parameter Update)

Figure 11:
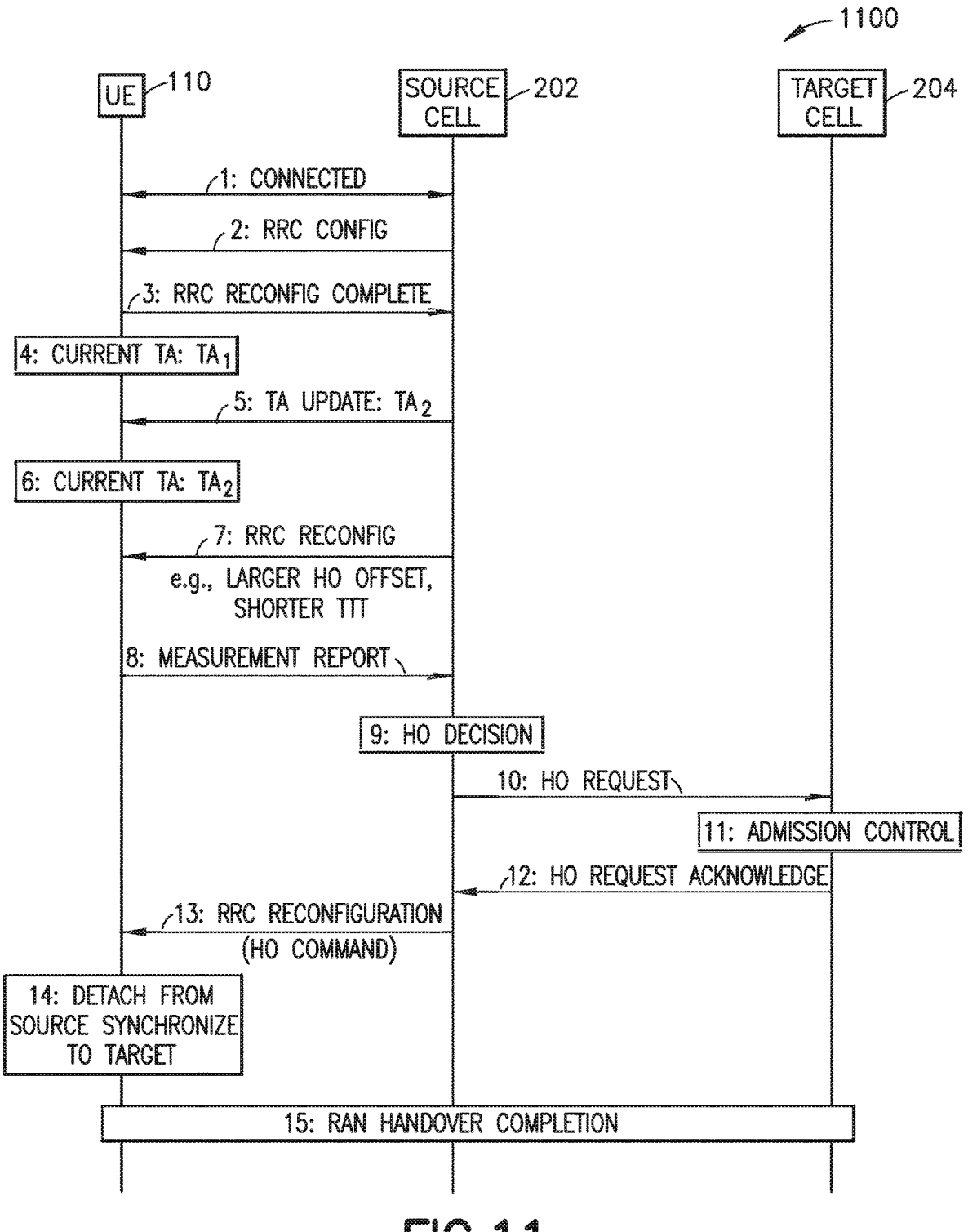
FIG. 11 depicts a signaling diagram for a TA based RRC reconfiguration HO parameter update (solution 3).

In solution 2, the UE was autonomously updating the handover parameters, using the TA where the updating method was configured via the RRC configuration that is sent in step 2. To capture all possible solutions, a network controlled update method is implemented in this solution. FIG. 11 depicts actions performed by the UE 110, source cell 202, and target cell 204. FIG. 11 shows the signaling diagram 1100 for solution 3.

1. UE 110 is connected to source cell 202 and served by this cell.

2. Source cell 202 sends the RRC Configuration message to configure UE 110 for target cell 204 measurements and report triggering conditions.

3. UE 110 sends the RRC Reconfiguration complete message to the network.

4. UE UL is synchronized to the serving cell and the TA that UE 110 is using is $T_{TA}=TA_1$.

5. UE 110 moves away from the source cell and UL transmission results in re-synchronization due to increased distance and propagation delay between UE 110 and the source cell. Source cell 202 sends the TA update, $_{TA}=TA_2$ to UE 110.

6. UE 110 applies the new TA, $TA_2$, and synchronizes on UL.

7. When TA increases as explained in step 5, the network reconfigures the handover parameters of the UE on the cell edge with a high TA value. For this, the network sends to the UE a new set of handover parameters via a RRC Reconfiguration message, e.g., larger HO offset, shorter TTT, etc., such that the HO condition expires earlier and UE 110 triggers the measurement report before an extreme TL HO is experienced by that UE.

8. UE 110 sends the measurement report to source cell 202. In RRC Config (step 2), the network configures UE 110 to include the target beam measurements when the TA condition is met. Therefore, UE 110 reports the target beam measurements along with the other measurements requested by source cell 202. Those target beam measurements are needed on Target cell 204 to determine the prepared beam (CBRA/CFRA) along with the cell preparation.

9. Source cell 202 decides to initiate handover preparation of target cell 204 based on the reported measurements.

10. The source cell sends the HO request to target cell 204.

11. Target cell 204 carries admission control before approving the handover request.

12. Target cell 204 prepares beams for the requested HO (for the UE to perform RACH on one or more beam(s)) and sends the HO Request Acknowledgement message which includes the beam preparation related configurations.

13. The source cell configures UE for HO towards target cell 204 by sending the RRC Reconfiguration.

14. Upon receiving the RRC reconfiguration, UE detaches from source cell 202 and initiates the HO towards target cell 204.

15. Handover of the UE 110 from source 202 to target cell 204 is completed.

Solution 4—TA Based Measurement Report Request

Current 3GPP specifications does not describe any method such that the source cell can request the target beam measurements with a message. Instead, either periodic or event driven reports are configured to UE 110 via RRC configuration/reconfiguration messages to trigger measurement reporting on the UE side. In this solution, the network directly request the measurement reporting via a "Target beam measurement request" message when the TA is large enough to initiate the HO on cell edge UEs.

Figure 12:
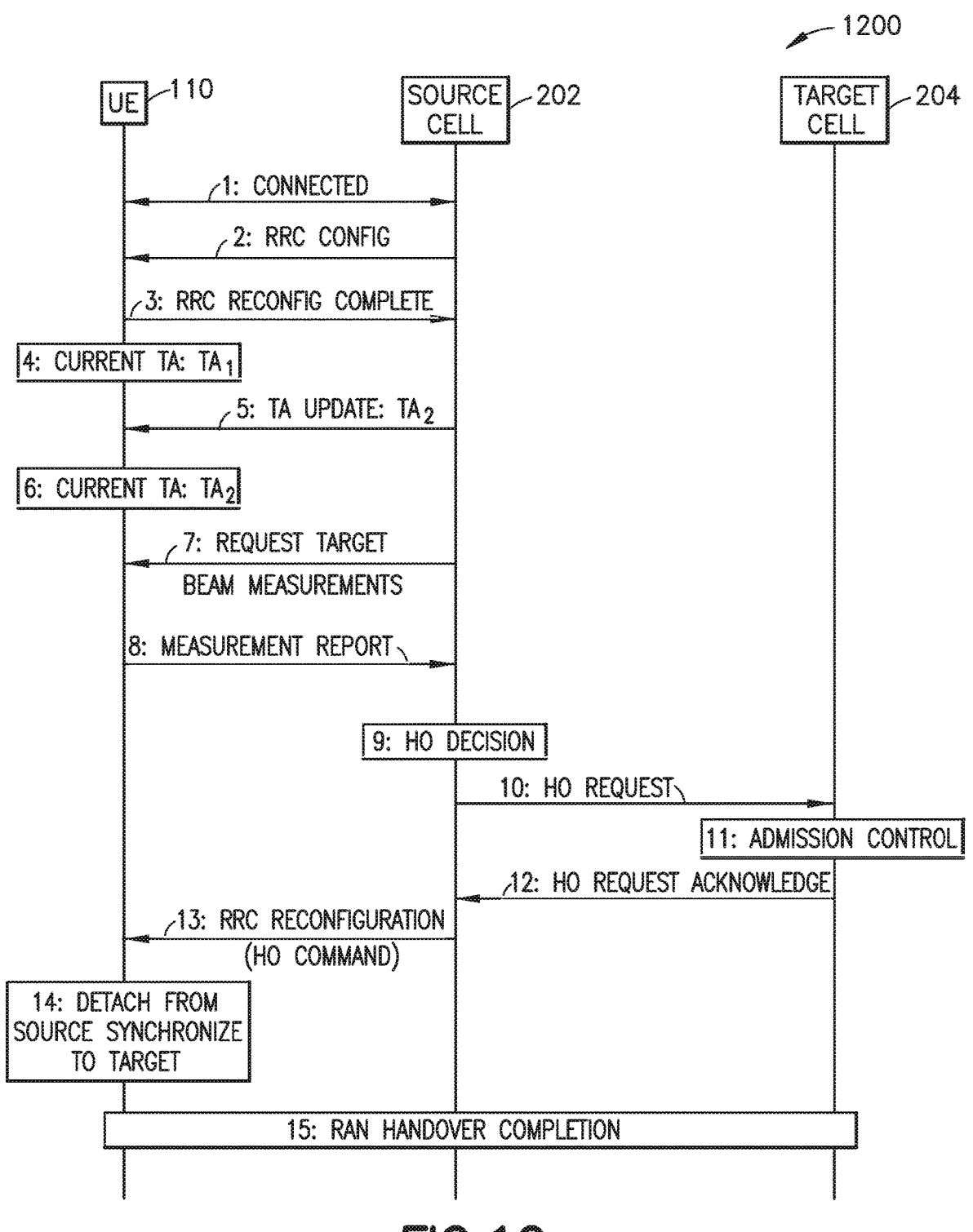
FIG. 12 depicts a signaling diagram for a TA based measurement report request (solution 4).

The signaling diagram 1200 of the solution is shown in FIG. 12 and the steps are explained below.

In solution 2, the UE was autonomously updating the handover parameters, using the TA where the updating method was configured via the RRC configuration that is sent in step 2. To capture possible solutions, a network controlled update method is utilized in this solution. FIG. 12 depicts actions performed by the UE 110, source cell 202, and target cell 204. FIG. 12 shows the signaling diagram 1200 for solution 4.

1. UE 110 is connected to source cell 202 and served by this cell.

2. Source cell 202 sends the RRC Configuration message to configure UE 110 for target cell measurements and report triggering conditions.

3. UE sends the RRC Reconfiguration complete message to the network.

4. UE UL is synchronized to the serving cell and the TA that UE 110 is using is $T_{TA}=TA_1$.

5. UE moves away from the source cell and UL transmission results in re-synchronization due to increased distance and propagation delay between UE 110 and the source cell. Source cell 202 sends the TA update, $_{TA}=TA_2$ to UE.

6. UE applies the new TA, $TA_2$, and synchronizes on UL.

7. Since the TA of the UE is known by the source cell, when TA increases as explained in step 5, the source cell sends the "target beam measurement request" message that is defined for the first time herein. Here, the message requests the UE to send the RSRP measurements including the target beam measurements as soon as the message is received.

8. UE 110 sends the measurement report to source cell 202. UE 110 reports the target beam measurements along with the other measurements requested by source cell 202 via the "target beam measurement request" received in step 7. Those target beam measurements are needed on Target cell 204 to determine the prepared beam (CBRA/CFRA) along with the cell preparation.

9. Source cell 202 decides to initiate handover preparation of target cell 204 based on the reported measurements.

10. The source cell sends the HO request to target cell 204.

11. Target cell 204 carries admission control before approving the handover request.

12. Target cell 204 prepares beams for the requested HO (for the UE to perform RACH on a beam(s)) and send the HO Request Acknowledgement message which includes the beam preparation related configurations.

13. The source cell configures UE for HO towards target cell 204 by sending the RRC Reconfiguration.

14. Upon receiving the RRC reconfiguration, UE detaches from source cell 202 and initiates the HO towards target cell 204.

15. Handover of the UE 110 from source 202 to target cell 204 is completed.

In the solutions mentioned above, the network can configure UE 110 for DL based TA adjustment such that the propagation delay change on two way transmission is considered and TA change provides more precise information on the traversed distance of the UE.

In 38.331, it is specified that the CHO execution can be based on two conditions where both conditions have to be satisfied before the UE executes the handover. TA based measurement reporting condition (implemented in Solution 1) can also be used as one leg of the dual event in CHO execution where one condition is based on RSRP, RSRQ and SINR and another condition is based on the TA based measurement reporting condition. This would ease the CHO execution condition to be met before the link degradation and does not lead any ping pong behavior as the TA based condition would prevent the CHO execution solely based on radio conditions.

There are several advantages and technical effects of the examples described herein. In FR2 beamformed systems, TA based HO procedures are implemented to avoid extreme TL handovers. In the herein described solutions, TA is used to identify whether the UE is on an extreme cell edge or not, despite the non-decaying RSRP measurements or delayed L3 RSRP measurements which do not trigger the legacy measurement reporting events.

Figures 13, 14:
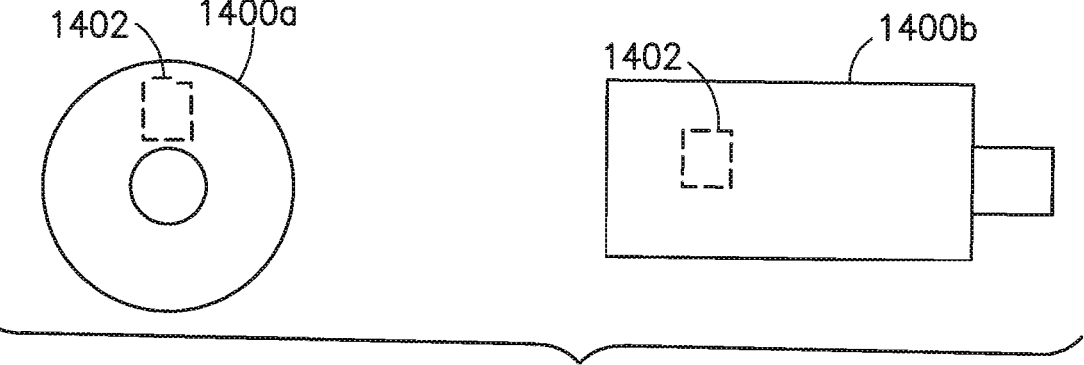
FIG. 13 is an example apparatus configured to implement the examples described herein.
FIG. 14 shows a representation of an example of non-volatile memory media.

FIG. 13 is an example apparatus 1300, which may be implemented in hardware, configured to implement the examples described herein. The apparatus 1300 comprises at least one processor 1302 (an FPGA and/or CPU), at least one memory 1304 including computer program code 1305, wherein at least one memory 1304 and the computer program code 1305 are configured to, with at least one processor 1302, cause the apparatus 1300 to implement circuitry, a process, component, module, or function (collectively control 1306) to implement the examples described herein, including a timing advance triggering measurement report for FR2 handover. The memory 1304 may be a non-transitory memory, a transitory memory, a volatile memory, or a non-volatile memory.

The apparatus 1300 optionally includes a display and/or I/O interface 1308 that may be used to display aspects or a status of the methods described herein (e.g., as one of the methods is being performed or at a subsequent time), or to receive input from a user such as with using a keypad. The apparatus 1300 includes one or more network communication interfaces (I/F(s)) 1310, such as a network (N/W) interface. The communication I/F(s) 1310 may be wired and/or wireless and communicate over the Internet/other network(s) via any communication technique. The communication I/F(s) 1310 may comprise one or more transmitters and one or more receivers. The communication I/F(s) 1310 may comprise standard well-known components such as an amplifier, filter, frequency-converter, (de)modulator, and encoder/decoder circuitries and one or more antennas.

The apparatus 1300 to implement the functionality of control 1306 may be UE 110, RAN node 170, network node 170-1, network node 170-2, or network element(s) 190. Thus, processor 1302 may correspond respectively to processor(s) 120, processor(s) 152 and/or processor(s) 175, memory 1304 may correspond respectively to memory(ies) 125, memory(ies) 155 and/or memory(ies) 171, computer program code 1305 may correspond respectively to computer program code 123, module 140-1, module 140-2, and/or computer program code 153, module 150-1, module 150-2, and/or computer program code 173, and communication I/F(s) 1310 may correspond respectively to N/W I/F(s) 161 and/or N/W I/F(s) 180. Alternatively, apparatus 1300 may not correspond to either of UE 110, RAN node 170, or network element(s) 190, as apparatus 1300 may be part of a self-organizing/optimizing network (SON) node, such as in a cloud. The apparatus 1300 may also be distributed throughout the network 100 including within and between apparatus 1300 and any network element (such as a network control element (NCE) 190 and/or the RAN node 170 and/or network node 170-1 and/or network node 170-2 and/or the UE 110).

Interface 1312 enables data communication between the various items of apparatus 1300, as shown in FIG. 13. For example, the interface 1312 may be one or more buses such as address, data, or control buses, and may include any interconnection mechanism, such as a series of lines on a motherboard or integrated circuit, fiber optics or other optical communication equipment, and the like. Computer program code 1305, including control 1306 may comprise object-oriented software configured to pass data/messages between objects within computer program code 1305. The apparatus 1300 need not comprise each of the features mentioned, or may comprise other features as well.

FIG. 14 shows a schematic representation of non-volatile memory media 1400a (e.g. computer disc (CD) or digital versatile disc (DVD)) and 1400b (e.g. universal serial bus (USB) memory stick) storing instructions and/or parameters 1402 which when executed by a processor allows the processor to perform one or more of the steps of the methods described previously.

FIG. 15 is an example method 1500, based on the examples described herein. At 1510, the method includes establishing a connection with a source cell. At 1520, the method includes determining a first timing advance that indicates a propagation delay of uplink transmission to the source cell. At 1530, the method includes determining a second timing advance that indicates a propagation delay of uplink transmission to a target cell. At 1540, the method includes determining whether to initiate a handover procedure to the target cell, based at least on the first timing advance. At 1550, the method includes synchronizing to the target cell during the handover procedure. Method 1500 may be performed with UE 110.

FIG. 16 is an example method 1600, based on the examples described herein. At 1610, the method includes establishing a connection with a user equipment. At 1620, the method includes transmitting, to the user equipment, an update to a timing advance that indicates a propagation delay of uplink transmission from the user equipment. At 1630, the method includes receiving, from the user equipment, at least one measurement related to a handover procedure to a target cell from a source cell, based on the timing advance. At 1640, the method includes determining whether to initiate handover preparation to the target cell, based on the at least one measurement. Method 1600 may be performed with source cell 202 or network node 170-1.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The following examples (1-108) and provided and described herein.

Example 1. An apparatus including: at least one processor; and at least one memory including computer program code; wherein the at least one memory and the computer program code are configured to, with the at least one processor, cause the apparatus at least to: establish a connection with a source cell; determine a first timing advance that indicates a propagation delay of uplink transmission to the source cell; determine a second timing advance that indicates a propagation delay of uplink transmission to a target cell; determine whether to initiate a handover procedure to the target cell, based at least on the first timing advance; and synchronize to the target cell during the handover procedure.

Example 2. The apparatus of example 1, wherein the apparatus is caused to: determine a timing advance for a plurality of neighbor cells comprising the target cell, the respective timing advance indicating the respective propagation delay of uplink transmission to the respective neighbor cell.

Example 3. The apparatus of any of examples 1 to 2, wherein the apparatus comprises a user equipment.

Example 4. The apparatus of any of examples 1 to 3, wherein the apparatus is caused to: receive, from the source cell, an update to the first timing advance.

Example 5. The apparatus of any of examples 1 to 4, wherein the apparatus is caused to: receive a configuration comprising a timing advance based handover event; determine whether the timing advance based handover event has occurred; and transmit at least one measurement to the source cell to initiate the handover procedure, in response to the timing based handover event having occurred.

Example 6. The apparatus of any of examples 1 to 5, wherein the apparatus is caused to: transmit the at least one measurement to the source cell to initiate the handover procedure, in response to the first timing advance being greater than a threshold for a given duration; or transmit the at least one measurement to the source cell to initiate the handover procedure, in response to the first timing advance added to an offset being greater than the second timing advance.

Example 7. The apparatus of any of examples 1 to 6, wherein the apparatus is caused to: scale at least one parameter using the first timing advance or the second timing advance, the at least one parameter configured to be used to determine whether to initiate the handover procedure to the target cell.

Example 8. The apparatus of any of examples 1 to 7, wherein the apparatus is caused to: increase a handover offset based on an increasing first timing advance, the handover offset comprising a difference between strength of a signal from the target cell and strength of a signal from the source cell; or decrease the handover offset based on a decreasing first timing advance.

Example 9. The apparatus of example 8, wherein the handover offset is increased so that the handover procedure to the target cell is initiated earlier than when the handover offset is not increased, and wherein the handover offset is decreased to prevent the handover procedure from initiating.

Example 10. The apparatus of any of examples 1 to 9, wherein the apparatus is caused to: decrease a time duration based on an increasing first timing advance, the time duration comprising a time a signal strength offset between the target cell and the source cell is greater than a threshold; or increase the time duration based on a decreasing first timing advance.

Example 11. The apparatus of example 10, wherein the time duration is decreased so that the handover procedure to the target cell is initiated earlier than when the time duration is not decreased, and wherein the time duration is increased to prevent the handover procedure from initiating.

Example 12. The apparatus of any of examples 1 to 11, wherein the apparatus is caused to: receive, from a network, a list of parameters to update handover parameters based on the first timing advance or the second timing advance, wherein at least one parameter is configured to be used to determine whether to initiate the handover procedure to the target cell.

Example 13. The apparatus of any of examples 1 to 12, wherein the apparatus is caused to: receive, from a network, a configuration that increases a handover offset based on an increasing first timing advance, the handover offset comprising a difference between strength of a signal from the target cell and strength of a signal from the source cell; or receive, from the network, a configuration that decreases the handover offset based on a decreasing first timing advance.

Example 14. The apparatus of example 13, wherein the handover offset is increased so that the handover procedure to the target cell is initiated earlier than when the handover offset is not increased, and wherein the handover offset is decreased to prevent the handover procedure from initiating.

Example 15. The apparatus of any of examples 1 to 14, wherein the apparatus is caused to: receive, from a network, a configuration that decreases a time duration based on an increasing first timing advance, the time duration comprising a time a signal strength offset between the target cell and the source cell is greater than a threshold; or receive, from the network, a configuration that increases the time duration based on a decreasing first timing advance.

Example 16. The apparatus of example 15, wherein the time duration is decreased so that the handover procedure to the target cell is initiated earlier than when the time duration is not decreased, and wherein the time duration is increased to prevent the handover procedure from initiating.

Example 17. The apparatus of any of examples 1 to 16, wherein the apparatus is caused to: transmit, to a network, at least one measurement of an aspect of at least one beam used for transmission to the target cell or reception from the target cell, the at least one measurement transmitted based on the first timing advance or the second timing advance.

Example 18. An apparatus including: at least one processor; and at least one memory including computer program code; wherein the at least one memory and the computer program code are configured to, with the at least one processor, cause the apparatus at least to: establish a connection with a user equipment; transmit, to the user equipment, an update to a timing advance that indicates a propagation delay of uplink transmission from the user equipment; receive, from the user equipment, at least one measurement related to a handover procedure to a target cell from a source cell, based on the timing advance; and determine whether to initiate handover preparation to the target cell, based on the at least one measurement.

Example 19. The apparatus of example 18, wherein the apparatus is caused to: transmit, to the user equipment, the update to the timing advance, in response to a distance between the user equipment and the source cell having increased.

Example 20. The apparatus of any of examples 18 to 19, wherein the apparatus is caused to: transmit, to the user equipment, a configuration comprising a timing advance based handover event; and receive, from the user equipment, the at least one measurement, in response to the timing based handover event having occurred.

Example 21. The apparatus of any of examples 18 to 20, wherein the apparatus is caused to: receive, from the user equipment, the at least one measurement related to the handover procedure, in response to the timing advance being greater than the threshold for a given duration; or receive, from the user equipment, the at least one measurement related to the handover procedure, in response to the timing advance added to an offset being greater than another timing advance, the another timing indicating a propagation delay of uplink transmission to a target cell.

Example 22. The apparatus of any of examples 18 to 21, wherein the apparatus is caused to: transmit, to the user equipment, a list of parameters to update handover parameters based on the timing advance, wherein at least one parameter is configured to be used to determine whether to initiate the handover procedure to the target cell.

Example 23. The apparatus of any of examples 18 to 22, wherein the apparatus is caused to: transmit, to the user equipment, a configuration that increases a handover offset based on an increasing timing advance, the handover offset comprising a difference between strength of a signal from the target cell and strength of a signal from the source cell; or transmit, to the user equipment, a configuration that decreases the handover offset based on a decreasing timing advance.

Example 24. The apparatus of example 23, wherein the handover offset is increased so that the handover procedure to the target cell is initiated earlier than when the handover offset is not increased, and wherein the handover offset is decreased to prevent the handover procedure from initiating.

Example 25. The apparatus of any of examples 18 to 24, wherein the apparatus is caused to: transmit, to the user equipment, a configuration that decreases a time duration based on an increasing timing advance, the time duration comprising a time a signal strength offset between the target cell and the source cell is greater than a threshold; or transmit, to the user equipment, a configuration that increases the time duration based on a decreasing timing advance.

Example 26. The apparatus of example 25, wherein the time duration is decreased so that the handover procedure to the target cell is initiated earlier than when the time duration is not decreased, and wherein the time duration is increased to prevent the handover procedure from initiating.

Example 27. The apparatus of any of examples 18 to 26, wherein the apparatus is caused to: receive, from the user equipment, at least one measurement of an aspect of at least one beam used for transmission to the target cell or reception from the target cell, the at least one measurement received based on the timing advance.

Example 28. A method including: establishing a connection with a source cell; determining a first timing advance that indicates a propagation delay of uplink transmission to the source cell; determining a second timing advance that indicates a propagation delay of uplink transmission to a target cell; determining whether to initiate a handover procedure to the target cell, based at least on the first timing advance; and synchronizing to the target cell during the handover procedure.

Example 29. The method of example 28, further including: determining a timing advance for a plurality of neighbor cells comprising the target cell, the respective timing advance indicating the respective propagation delay of uplink transmission to the respective neighbor cell.

Example 30. The method of any of examples 28 to 29, performed with a user equipment.

Example 31. The method of any of examples 28 to 30, further including: receiving, from the source cell, an update to the first timing advance.

Example 32. The method of any of examples 28 to 31, further including: receiving a configuration comprising a timing advance based handover event; determining whether the timing advance based handover event has occurred; and transmitting at least one measurement to the source cell to initiate the handover procedure, in response to the timing based handover event having occurred.

Example 33. The method of any of examples 28 to 32, further including: transmitting the at least one measurement to the source cell to initiate the handover procedure, in response to the first timing advance being greater than a threshold for a given duration; or transmitting the at least one measurement to the source cell to initiate the handover procedure, in response to the first timing advance added to an offset being greater than the second timing advance.

Example 34. The method of any of examples 28 to 33, further including: scaling at least one parameter using the first timing advance or the second timing advance, the at least one parameter configured to be used to determine whether to initiate the handover procedure to the target cell.

Example 35. The method of any of examples 28 to 34, further including: increasing a handover offset based on an increasing first timing advance, the handover offset comprising a difference between strength of a signal from the target cell and strength of a signal from the source cell; or decreasing the handover offset based on a decreasing first timing advance.

Example 36. The method of example 35, wherein the handover offset is increased so that the handover procedure to the target cell is initiated earlier than when the handover offset is not increased, and wherein the handover offset is decreased to prevent the handover procedure from initiating.

Example 37. The method of any of examples 28 to 36, further including: decreasing a time duration based on an increasing first timing advance, the time duration comprising a time a signal strength offset between the target cell and the source cell is greater than a threshold; or increasing the time duration based on a decreasing first timing advance.

Example 38. The method of example 37, wherein the time duration is decreased so that the handover procedure to the target cell is initiated earlier than when the time duration is not decreased, and wherein the time duration is increased to prevent the handover procedure from initiating.

Example 39. The method of any of examples 28 to 38, further including: receiving, from a network, a list of parameters to update handover parameters based on the first timing advance or the second timing advance, wherein at least one parameter is configured to be used to determine whether to initiate the handover procedure to the target cell.

Example 40. The method of any of examples 28 to 39, further including: receiving, from a network, a configuration that increases a handover offset based on an increasing first timing advance, the handover offset comprising a difference between strength of a signal from the target cell and strength of a signal from the source cell; or receiving, from the network, a configuration that decreases the handover offset based on a decreasing first timing advance.

Example 41. The method of example 40, wherein the handover offset is increased so that the handover procedure to the target cell is initiated earlier than when the handover offset is not increased, and wherein the handover offset is decreased to prevent the handover procedure from initiating.

Example 42. The method of any of examples 28 to 41, further including: receiving, from a network, a configuration that decreases a time duration based on an increasing first timing advance, the time duration comprising a time a signal strength offset between the target cell and the source cell is greater than a threshold; or receiving, from the network, a configuration that increases the time duration based on a decreasing first timing advance.

Example 43. The method of example 42, wherein the time duration is decreased so that the handover procedure to the target cell is initiated earlier than when the time duration is not decreased, and wherein the time duration is increased to prevent the handover procedure from initiating.

Example 44. The method of any of examples 28 to 43, further including: transmitting, to a network, at least one measurement of an aspect of at least one beam used for transmission to the target cell or reception from the target cell, the at least one measurement transmitted based on the first timing advance or the second timing advance.

Example 45. A method including: establishing a connection with a user equipment; transmitting, to the user equipment, an update to a timing advance that indicates a propagation delay of uplink transmission from the user equipment; receiving, from the user equipment, at least one measurement related to a handover procedure to a target cell from a source cell, based on the timing advance; and determining whether to initiate handover preparation to the target cell, based on the at least one measurement.

Example 46. The method of example 45, further including: transmitting, to the user equipment, the update to the timing advance, in response to a distance between the user equipment and the source cell having increased.

Example 47. The method of any of examples 45 to 46, further including: transmitting, to the user equipment, a configuration comprising a timing advance based handover event; and receiving, from the user equipment, the at least one measurement, in response to the timing based handover event having occurred.

Example 48. The method of any of examples 45 to 47, further including: receiving, from the user equipment, the at least one measurement related to the handover procedure, in response to the timing advance being greater than the threshold for a given duration; or receiving, from the user equipment, the at least one measurement related to the handover procedure, in response to the timing advance added to an offset being greater than another timing advance, the another timing indicating a propagation delay of uplink transmission to a target cell.

Example 49. The method of any of examples 45 to 48, further including: transmitting, to the user equipment, a list of parameters to update handover parameters based on the timing advance, wherein at least one parameter is configured to be used to determine whether to initiate the handover procedure to the target cell.

Example 50. The method of any of examples 45 to 49, further including: transmitting, to the user equipment, a configuration that increases a handover offset based on an increasing timing advance, the handover offset comprising a difference between strength of a signal from the target cell and strength of a signal from the source cell; or transmitting, to the user equipment, a configuration that decreases the handover offset based on a decreasing timing advance.

Example 51. The method of example 50, wherein the handover offset is increased so that the handover procedure to the target cell is initiated earlier than when the handover offset is not increased, and wherein the handover offset is decreased to prevent the handover procedure from initiating.

Example 52. The method of any of examples 45 to 51, further including: transmitting, to the user equipment, a configuration that decreases a time duration based on an increasing timing advance, the time duration comprising a time a signal strength offset between the target cell and the source cell is greater than a threshold; or transmitting, to the user equipment, a configuration that increases the time duration based on a decreasing timing advance.

Example 53. The method of example 52, wherein the time duration is decreased so that the handover procedure to the target cell is initiated earlier than when the time duration is not decreased, and wherein the time duration is increased to prevent the handover procedure from initiating.

Example 54. The method of any of examples 45 to 53, further including: receiving, from the user equipment, at least one measurement of an aspect of at least one beam used for transmission to the target cell or reception from the target cell, the at least one measurement received based on the timing advance.

Example 55. A non-transitory program storage device readable by a machine, tangibly embodying a program of instructions executable with the machine for performing operations, the operations including: establishing a connection with a source cell; determining a first timing advance that indicates a propagation delay of uplink transmission to the source cell; determining a second timing advance that indicates a propagation delay of uplink transmission to a target cell; determining whether to initiate a handover procedure to the target cell, based at least on the first timing advance; and synchronizing to the target cell during the handover procedure.

Example 56. The non-transitory program storage device of example 55, the operations further including: determining a timing advance for a plurality of neighbor cells comprising the target cell, the respective timing advance indicating the respective propagation delay of uplink transmission to the respective neighbor cell.

Example 57. The non-transitory program storage device of any of examples 55 to 56, the operations performed with a user equipment.

Example 58. The non-transitory program storage device of any of examples 55 to 57, the operations further including: receiving, from the source cell, an update to the first timing advance.

Example 59. The non-transitory program storage device of any of examples 55 to 58, the operations further including: receiving a configuration comprising a timing advance based handover event; determining whether the timing advance based handover event has occurred; and transmitting at least one measurement to the source cell to initiate the handover procedure, in response to the timing based handover event having occurred.

Example 60. The non-transitory program storage device of any of examples 55 to 59, the operations further including: transmitting the at least one measurement to the source cell to initiate the handover procedure, in response to the first timing advance being greater than a threshold for a given duration; or transmitting the at least one measurement to the source cell to initiate the handover procedure, in response to the first timing advance added to an offset being greater than the second timing advance.

Example 61. The non-transitory program storage device of any of examples 55 to 60, the operations further including: scaling at least one parameter using the first timing advance or the second timing advance, the at least one parameter configured to be used to determine whether to initiate the handover procedure to the target cell.

Example 62. The non-transitory program storage device of any of examples 55 to 61, the operations further including: increasing a handover offset based on an increasing first timing advance, the handover offset comprising a difference between strength of a signal from the target cell and strength of a signal from the source cell; or decreasing the handover offset based on a decreasing first timing advance.

Example 63. The non-transitory program storage device of example 62, wherein the handover offset is increased so that the handover procedure to the target cell is initiated earlier than when the handover offset is not increased, and wherein the handover offset is decreased to prevent the handover procedure from initiating.

Example 64. The non-transitory program storage device of any of examples 55 to 63, the operations further including: decreasing a time duration based on an increasing first timing advance, the time duration comprising a time a signal strength offset between the target cell and the source cell is greater than a threshold; or increasing the time duration based on a decreasing first timing advance.

Example 65. The non-transitory program storage device of example 64, wherein the time duration is decreased so that the handover procedure to the target cell is initiated earlier than when the time duration is not decreased, and wherein the time duration is increased to prevent the handover procedure from initiating.

Example 66. The non-transitory program storage device of any of examples 55 to 65, the operations further including: receiving, from a network, a list of parameters to update handover parameters based on the first timing advance or the second timing advance, wherein at least one parameter is configured to be used to determine whether to initiate the handover procedure to the target cell.

Example 67. The non-transitory program storage device of any of examples 55 to 66, the operations further including: receiving, from a network, a configuration that increases a handover offset based on an increasing first timing advance, the handover offset comprising a difference between strength of a signal from the target cell and strength of a signal from the source cell; or receiving, from the network, a configuration that decreases the handover offset based on a decreasing first timing advance.

Example 68. The non-transitory program storage device of example 67, wherein the handover offset is increased so that the handover procedure to the target cell is initiated earlier than when the handover offset is not increased, and wherein the handover offset is decreased to prevent the handover procedure from initiating.

Example 69. The non-transitory program storage device of any of examples 55 to 68, the operations further including: receiving, from a network, a configuration that decreases a time duration based on an increasing first timing advance, the time duration comprising a time a signal strength offset between the target cell and the source cell is greater than a threshold; or receiving, from the network, a configuration that increases the time duration based on a decreasing first timing advance.

Example 70. The non-transitory program storage device of example 69, wherein the time duration is decreased so that the handover procedure to the target cell is initiated earlier than when the time duration is not decreased, and wherein the time duration is increased to prevent the handover procedure from initiating.

Example 71. The non-transitory program storage device of any of examples 55 to 70, the operations further including: transmitting, to a network, at least one measurement of an aspect of at least one beam used for transmission to the target cell or reception from the target cell, the at least one measurement transmitted based on the first timing advance or the second timing advance.

Example 72. A non-transitory program storage device readable by a machine, tangibly embodying a program of instructions executable with the machine for performing operations, the operations including: establishing a connection with a user equipment; transmitting, to the user equipment, an update to a timing advance that indicates a propagation delay of uplink transmission from the user equipment; receiving, from the user equipment, at least one measurement related to a handover procedure to a target cell from a source cell, based on the timing advance; and determining whether to initiate handover preparation to the target cell, based on the at least one measurement.

Example 73. The non-transitory program storage device of example 72, the operations further including: transmitting, to the user equipment, the update to the timing advance, in response to a distance between the user equipment and the source cell having increased.

Example 74. The non-transitory program storage device of any of examples 72 to 73, the operations further including: transmitting, to the user equipment, a configuration comprising a timing advance based handover event; and receiving, from the user equipment, the at least one measurement, in response to the timing based handover event having occurred.

Example 75. The non-transitory program storage device of any of examples 72 to 74, the operations further including: receiving, from the user equipment, the at least one measurement related to the handover procedure, in response to the timing advance being greater than the threshold for a given duration; or receiving, from the user equipment, the at least one measurement related to the handover procedure, in response to the timing advance added to an offset being greater than another timing advance, the another timing indicating a propagation delay of uplink transmission to a target cell.

Example 76. The non-transitory program storage device of any of examples 72 to 75, the operations further including: transmitting, to the user equipment, a list of parameters to update handover parameters based on the timing advance, wherein at least one parameter is configured to be used to determine whether to initiate the handover procedure to the target cell.

Example 77. The non-transitory program storage device of any of examples 72 to 76, the operations further including: transmitting, to the user equipment, a configuration that increases a handover offset based on an increasing timing advance, the handover offset comprising a difference between strength of a signal from the target cell and strength of a signal from the source cell; or transmitting, to the user equipment, a configuration that decreases the handover offset based on a decreasing timing advance.

Example 78. The non-transitory program storage device of example 77, wherein the handover offset is increased so that the handover procedure to the target cell is initiated earlier than when the handover offset is not increased, and wherein the handover offset is decreased to prevent the handover procedure from initiating.

Example 79. The non-transitory program storage device of any of examples 72 to 78, the operations further including: transmitting, to the user equipment, a configuration that decreases a time duration based on an increasing timing advance, the time duration comprising a time a signal strength offset between the target cell and the source cell is greater than a threshold; or transmitting, to the user equipment, a configuration that increases the time duration based on a decreasing timing advance.

Example 80. The non-transitory program storage device of example 79, wherein the time duration is decreased so that the handover procedure to the target cell is initiated earlier than when the time duration is not decreased, and wherein the time duration is increased to prevent the handover procedure from initiating.

Example 81. The non-transitory program storage device of any of examples 72 to 80, the operations further including: receiving, from the user equipment, at least one mea-surement of an aspect of at least one beam used for trans-mission to the target cell or reception from the target cell, the at least one measurement received based on the timing advance.

Example 82. An apparatus including: means for estab-lishing a connection with a source cell; means for determin-ing a first timing advance that indicates a propagation delay of uplink transmission to the source cell; means for deter-mining a second timing advance that indicates a propagation delay of uplink transmission to a target cell; means for determining whether to initiate a handover procedure to the target cell, based at least on the first timing advance; and means for synchronizing to the target cell during the han-dover procedure.

Example 83. The apparatus of example 82, further includ-ing: means for determining a timing advance for a plurality of neighbor cells comprising the target cell, the respective timing advance indicating the respective propagation delay of uplink transmission to the respective neighbor cell.

Example 84. The apparatus of any of examples 82 to 83, wherein the apparatus comprises a user equipment.

Example 85. The apparatus of any of examples 82 to 84, further including: means for receiving, from the source cell, an update to the first timing advance.

Example 86. The apparatus of any of examples 82 to 85, further including: means for receiving a configuration com-prising a timing advance based handover event; means for determining whether the timing advance based handover event has occurred; and means for transmitting at least one measurement to the source cell to initiate the handover procedure, in response to the timing based handover event having occurred.

Example 87. The apparatus of any of examples 82 to 86, further including: means for transmitting the at least one measurement to the source cell to initiate the handover procedure, in response to the first timing advance being greater than a threshold for a given duration; or means for transmitting the at least one measurement to the source cell to initiate the handover procedure, in response to the first timing advance added to an offset being greater than the second timing advance.

Example 88. The apparatus of any of examples 82 to 87, further including: means for scaling at least one parameter using the first timing advance or the second timing advance, the at least one parameter configured to be used to determine whether to initiate the handover procedure to the target cell.

Example 89. The apparatus of any of examples 82 to 88, further including: means for increasing a handover offset based on an increasing first timing advance, the handover offset comprising a difference between strength of a signal from the target cell and strength of a signal from the source cell; or means for decreasing the handover offset based on a decreasing first timing advance.

Example 90. The apparatus of example 89, wherein the handover offset is increased so that the handover procedure to the target cell is initiated earlier than when the handover offset is not increased, and wherein the handover offset is decreased to prevent the handover procedure from initiating.

Example 91. The apparatus of any of examples 82 to 90, further including: means for decreasing a time duration based on an increasing first timing advance, the time dura-tion comprising a time a signal strength offset between the target cell and the source cell is greater than a threshold; or means for increasing the time duration based on a decreasing first timing advance.

Example 92. The apparatus of example 91, wherein the time duration is decreased so that the handover procedure to the target cell is initiated earlier than when the time duration is not decreased, and wherein the time duration is increased to prevent the handover procedure from initiating.

Example 93. The apparatus of any of examples 82 to 92, further including: means for receiving, from a network, a list of parameters to update handover parameters based on the first timing advance or the second timing advance, wherein at least one parameter is configured to be used to determine whether to initiate the handover procedure to the target cell.

Example 94. The apparatus of any of examples 82 to 93, further including: means for receiving, from a network, a configuration that increases a handover offset based on an increasing first timing advance, the handover offset comprising a difference between strength of a signal from the target cell and strength of a signal from the source cell; or means for receiving, from the network, a configuration that decreases the handover offset based on a decreasing first timing advance.

Example 95. The apparatus of example 94, wherein the handover offset is increased so that the handover procedure to the target cell is initiated earlier than when the handover offset is not increased, and wherein the handover offset is decreased to prevent the handover procedure from initiating.

Example 96. The apparatus of any of examples 82 to 95, further including: means for receiving, from a network, a configuration that decreases a time duration based on an increasing first timing advance, the time duration comprising a time a signal strength offset between the target cell and the source cell is greater than a threshold; or means for receiving, from the network, a configuration that increases the time duration based on a decreasing first timing advance.

Example 97. The apparatus of example 96, wherein the time duration is decreased so that the handover procedure to the target cell is initiated earlier than when the time duration is not decreased, and wherein the time duration is increased to prevent the handover procedure from initiating.

Example 98. The apparatus of any of examples 82 to 97, further including: means for transmitting, to a network, at least one measurement of an aspect of at least one beam used for transmission to the target cell or reception from the target cell, the at least one measurement transmitted based on the first timing advance or the second timing advance.

Example 99. An apparatus including: means for establishing a connection with a user equipment; means for transmitting, to the user equipment, an update to a timing advance that indicates a propagation delay of uplink transmission from the user equipment; means for receiving, from the user equipment, at least one measurement related to a handover procedure to a target cell from a source cell, based on the timing advance; and means for determining whether to initiate handover preparation to the target cell, based on the at least one measurement.

Example 100. The apparatus of example 99, further including: means for transmitting, to the user equipment, the update to the timing advance, in response to a distance between the user equipment and the source cell having increased.

Example 101. The apparatus of any of examples 99 to 100, further including: means for transmitting, to the user equipment, a configuration comprising a timing advance based handover event; and means for receiving, from the user equipment, the at least one measurement, in response to the timing based handover event having occurred.

Example 102. The apparatus of any of examples 99 to 101, further including: means for receiving, from the user equipment, the at least one measurement related to the handover procedure, in response to the timing advance being greater than the threshold for a given duration; or means for receiving, from the user equipment, the at least one measurement related to the handover procedure, in response to the timing advance added to an offset being greater than another timing advance, the another timing indicating a propagation delay of uplink transmission to a target cell.

Example 103. The apparatus of any of examples 99 to 102, further including: means for transmitting, to the user equipment, a list of parameters to update handover parameters based on the timing advance, wherein at least one parameter is configured to be used to determine whether to initiate the handover procedure to the target cell.

Example 104. The apparatus of any of examples 99 to 103, further including: means for transmitting, to the user equipment, a configuration that increases a handover offset based on an increasing timing advance, the handover offset comprising a difference between strength of a signal from the target cell and strength of a signal from the source cell; or means for transmitting, to the user equipment, a configuration that decreases the handover offset based on a decreasing timing advance.

Example 105. The apparatus of example 104, wherein the handover offset is increased so that the handover procedure to the target cell is initiated earlier than when the handover offset is not increased, and wherein the handover offset is decreased to prevent the handover procedure from initiating.

106. The apparatus of any of examples 99 to 105, further including: means for transmitting, to the user equipment, a configuration that decreases a time duration based on an increasing timing advance, the time duration comprising a time a signal strength offset between the target cell and the source cell is greater than a threshold; or means for transmitting, to the user equipment, a configuration that increases the time duration based on a decreasing timing advance.

Example 107. The apparatus of example 106, wherein the time duration is decreased so that the handover procedure to the target cell is initiated earlier than when the time duration is not decreased, and wherein the time duration is increased to prevent the handover procedure from initiating.

Example 108. The apparatus of any of examples 99 to 107, further including: means for receiving, from the user equipment, at least one measurement of an aspect of at least one beam used for transmission to the target cell or reception from the target cell, the at least one measurement received based on the timing advance.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

In the figures, lines represent couplings and arrows represent directional couplings or direction of data flow in the case of use for an apparatus, and lines represent couplings and arrows represent transitions or direction of data flow in the case of use for a method.

The following acronyms and abbreviations that may be found in the specification and/or the drawing figures are defined as follows:

3GPP third generation partnership project
4G fourth generation
5G fifth generation
5GC 5G core network

33

A1 event triggered when serving cell becomes better than threshold

A2 event triggered when serving cell becomes worse than threshold

A3 or A$_3$ event triggered when a neighboring cell becomes better than the serving cell by an offset A4 event triggered when neighbor cell becomes better than a threshold A5 event triggered when SpCell becomes worse than a first threshold and neighbor cell becomes better than a second threshold A6 event triggered when neighbor becomes offset better than SCell ACK acknowledgement AMF access and mobility management function AoD angle of departure ASIC application-specific integrated circuit B1 inter RAT neighbor becomes better than threshold B2 event triggered when a primary serving cell becomes worse than a first threshold, while a neighbor inter-RAT cell becomes better than a second threshold BS base station C1 the NR sidelink channel busy ratio is above a threshold C2 the NR sidelink channel busy ratio is below a threshold CBRA contention based random access CFRA contention free random access CHO conditional handover CIO cell individual offset Config configuration CPU central processing unit CU central unit or centralized unit DL downlink DSP digital signal processor DU distributed unit eNB evolved Node B (e.g., an LTE base station)

EN-DC E-UTRA-NR dual connectivity en-gNB node providing NR user plane and control plane protocol terminations towards the UE, and acting as a secondary node in EN-DC E-UTRA evolved universal terrestrial radio access, i.e., the LTE radio access technology F1 interface between the CU and the DU FPGA field-programmable gate array FR1 frequency range 1

FR2 frequency range 2 gNB base station for 5G/NR, i.e., a node providing NR user plane and control plane protocol terminations towards the UE, and connected via the NG interface to the 5GC HO handover I1 interference becomes higher than absolute threshold I/F interface I/O input/output KPI key performance indicator L1 layer 1

L3 layer 3

LMF location management function

LTE long term evolution (4G)

MAC medium access control

MME mobility management entity

MRO mobility robustnesss optimization

NCE network control element ng or NG new generation ng-eNB new generation eNB

NG-RAN new generation radio access network

34

NR new radio (5G)

N/W network

OAM operation, administration and maintenance

PDA personal digital assistant

PDCP packet data convergence protocol

PHY physical layer

RACH random access channel

RAN radio access network

RAT radio access technology

Reconfig reconfiguration

Rel release

RLC radio link control

RLF radio link failure

RRC radio resource control (protocol)

RRH remote radio head

RSRP reference signal received power

RSRQ reference signal received quality

RU radio unit

Rx or RX receive, receiver, or reception

SCell secondary cell

SF subframe

SGW serving gateway

SINR signal to interference and noise ratio

SON self-organizing/optimizing network

SpCell special cell

T time

T310 timer in 5G

TA timing advance

TAC timing advance command

TDMA time-division multiple access

TE too early

TL too late

TRP transmission and/or reception point

TTT time to trigger

Tx transmit, transmitter, or transmission

UE user equipment (e.g., a wireless, typically mobile device)

UL uplink

UPF user plane function

X2 network interface between RAN nodes and between RAN and the core network

Xn or XN network interface between NG-RAN nodes

What is claimed is:

1. A user equipment (UE) comprising:

at least one processor; and at least one memory including computer program code;

wherein the at least one memory and the computer program code are configured to, with the at least one processor, cause the UE at least to:

establish a connection with a source cell;

determine a first timing advance that indicates a propagation delay of uplink transmission to the source cell;

determine a second timing advance that indicates a propagation delay of uplink transmission to a target cell;

scale at least one parameter using the first timing advance or the second timing advance;

determine whether to initiate a handover procedure to the target cell, based at least on the first timing advance and the at least one parameter; and synchronize to the target cell during the handover procedure.

2. The UE of claim 1, wherein the UE is caused to:

determine a timing advance for a plurality of neighbor cells comprising the target cell, the respective timing advance indicating the respective propagation delay of uplink transmission to the respective neighbor cell.

3. The UE of claim 1, wherein the UE is caused to:

receive, from the source cell, an update to the first timing advance.

4. The UE of claim 1, wherein the UE is caused to:

receive a configuration comprising a timing advance based handover event;

determine whether the timing advance based handover event has occurred; and transmit at least one measurement to the source cell to initiate the handover procedure, in response to the timing advance based handover event having occurred.

5. The UE of claim 4, wherein the UE is caused to:

transmit the at least one measurement to the source cell to initiate the handover procedure, in response to the first timing advance being greater than a threshold for a given duration; or transmit the at least one measurement to the source cell to initiate the handover procedure, in response to the first timing advance added to an offset being greater than the second timing advance.

6. The UE of claim 1, wherein the UE is caused to:

increase a handover offset based on an increasing first timing advance, the handover offset comprising a difference between strength of a signal from the target cell and strength of a signal from the source cell; or decrease the handover offset based on a decreasing first timing advance.

7. The UE of claim 6, wherein the handover offset is increased so that the handover procedure to the target cell is initiated earlier than when the handover offset is not increased, and wherein the handover offset is decreased to prevent the handover procedure from initiating.

8. The UE of claim 1, wherein the UE is caused to:

decrease a time duration based on an increasing first timing advance, the time duration comprising a time a signal strength offset between the target cell and the source cell is greater than a threshold; or increase the time duration based on a decreasing first timing advance.

9. The UE of claim 8, wherein the time duration is decreased so that the handover procedure to the target cell is initiated earlier than when the time duration is not decreased, and wherein the time duration is increased to prevent the handover procedure from initiating.

10. The UE of claim 1, wherein the UE is caused to:

receive, from a network, a list of parameters to update handover parameters based on the first timing advance or the second timing advance, wherein the list of parameters includes the at least one parameter is used to determine whether to initiate the handover procedure to the target cell.

11. The UE of claim 1, wherein the UE is caused to:

receive, from a network, a configuration that increases a handover offset based on an increasing first timing advance, the handover offset comprising a difference between strength of a signal from the target cell and strength of a signal from the source cell; or receive, from the network, a configuration that decreases the handover offset based on a decreasing first timing advance.

12. The UE of claim 11, wherein the handover offset is increased so that the handover procedure to the target cell is initiated earlier than when the handover offset is not increased, and wherein the handover offset is decreased to prevent the handover procedure from initiating.

13. The UE of claim 1, wherein the UE is caused to:

receive, from a network, a configuration that decreases a time duration based on an increasing first timing advance, the time duration comprising a time a signal strength offset between the target cell and the source cell is greater than a threshold; or receive, from the network, a configuration that increases the time duration based on a decreasing first timing advance.

14. The UE of claim 13, wherein the time duration is decreased so that the handover procedure to the target cell is initiated earlier than when the time duration is not decreased, and wherein the time duration is increased to prevent the handover procedure from initiating.

15. The UE of claim 1, wherein the UE is caused to:

transmit, to a network, at least one measurement of an aspect of at least one beam used for transmission to the target cell or reception from the target cell, the at least one measurement transmitted based on the first timing advance or the second timing advance.

16. An apparatus comprising:

at least one processor; and at least one memory including computer program code;

wherein the at least one memory and the computer program code are configured to, with the at least one processor, cause the apparatus at least to:

establish a connection with a user equipment;

transmit, to the user equipment, an update to a timing advance that indicates a propagation delay of uplink transmission from the user equipment;

transmit, to the user equipment, a configuration to scale at least one parameter using the timing advance, the at least one parameter configured to be used to determine whether to initiate a handover procedure to a target cell from a source cell;

receive, from the user equipment, at least one measurement related to the handover procedure, based on the timing advance; and determine whether to initiate handover preparation to the target cell, based on the at least one measurement.

17. The apparatus of claim 16, wherein the apparatus is caused to:

transmit, to the user equipment, the update to the timing advance, in response to a distance between the user equipment and the source cell having increased.

18. The apparatus of claim 17, wherein the apparatus is caused to:

transmit, to the user equipment, a configuration comprising a timing advance based handover event; and receive, from the user equipment, the at least one measurement, in response to the timing advance based handover event having occurred.

19. A method comprising:

establishing, by a user equipment, a connection with a source cell;

determining a first timing advance that indicates a propagation delay of uplink transmission to the source cell;

determining a second timing advance that indicates a propagation delay of uplink transmission to a target cell;

scale at least one parameter using the first timing advance or the second timing advance;

determining whether to initiate a handover procedure to the target cell, based at least on the first timing advance and the at least one parameter; and synchronizing to the target cell during the handover procedure.

\* \* \* \* \*